US011996918B2

(12) United States Patent
Raghavan et al.

(10) Patent No.: US 11,996,918 B2
(45) Date of Patent: *May 28, 2024

(54) TECHNIQUES FOR INDICATING PREFERRED BEAMS IN MULTI-TRANSMISSION AND RECEPTION POINT (MULTI-TRP) SYSTEMS BASED ON DEFAULT OPERATING FREQUENCY (DOF) MISMATCH

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,215

(22) Filed: May 17, 2022

(65) Prior Publication Data

US 2022/0294503 A1   Sep. 15, 2022

Related U.S. Application Data

(63) Continuation of application No. 17/104,435, filed on Nov. 25, 2020, now Pat. No. 11,342,970.

(51) Int. Cl.
*H04B 7/02* (2018.01)
*H04B 7/024* (2017.01)
(Continued)

(52) U.S. Cl.
CPC ........... *H04B 7/0456* (2013.01); *H04B 7/024* (2013.01); *H04B 7/0639* (2013.01);
(Continued)

(58) Field of Classification Search
CPC .... H04B 7/024; H04B 7/0456; H04B 7/0632; H04B 7/0695
(Continued)

(56) References Cited

U.S. PATENT DOCUMENTS 11,342,970 B1 * 5/2022 Raghavan .............. H04B 7/088
2016/0183222 A1   6/2016 Suzuki et al.
(Continued)

OTHER PUBLICATIONS

Huawei., et al., "Beam Management Across Multiple Carriers", 3GPP Draft, 3GPP TSG RAN WG1 Meeting #88bis, R1-1704232, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051242384, 5 Pages, Retrieved from the Internet: URL: http://www.3gpp.org/ftp/Meetings_3GPP_SYNC/RAN1/Docs/ [retrieved on Apr. 2, 2017], Sections 1-3, p. 1-p. 5 Figures 1-3.

(Continued)

*Primary Examiner* — Emmanuel Bayard
(74) *Attorney, Agent, or Firm* — Holland & Hart LLP

(57) ABSTRACT

This disclosure provides systems, methods and apparatuses for a selection of one or more transmission and reception points (TRPs) within a multi-TRP system. In one aspect, a user equipment (UE) may transmit an indication of the selected TRPs and an indication of one or more beams that the selected TRPs may use to communicate with the UE based on a mismatch between a default operating frequency (DOF) of each TRP within the multi-TRP system and a DOF of the UE. For example, the UE may receive an indication of a DOF of each antenna port of the TRPs within the multi-TRP system and the UE may compare the indicated DOFs with a DOF of each antenna module of the UE. The UE may select to communicate with TRPs and select one or
(Continued)

more ports that the selected TRPs may use to communicate with the UE based on the comparison.

20 Claims, 8 Drawing Sheets

(51) Int. Cl.
*H04B 7/0456* (2017.01)
*H04B 7/06* (2006.01)
*H04W 28/18* (2009.01)
*H04W 48/20* (2009.01)
*H04W 72/0453* (2023.01)

(52) U.S. Cl.
CPC .......... *H04B 7/0695* (2013.01); *H04W 28/18* (2013.01); *H04W 48/20* (2013.01); *H04W 72/0453* (2013.01)

(58) Field of Classification Search
USPC ......................................... 375/219–222, 262
See application file for complete search history.

(56) References Cited

U.S. PATENT DOCUMENTS

| | | |
|---|---|---|
| 2016/0211898 A1* | 7/2016 | Cai ...................... H04B 7/0617 |
| 2017/0346525 A1 | 11/2017 | Stirling-Gallacher et al. |
| 2018/0054348 A1 | 2/2018 | Luo et al. |
| 2018/0091212 A1* | 3/2018 | Lee ....................... H04L 5/0048 |
| 2018/0199328 A1 | 7/2018 | Sang et al. |
| 2019/0239092 A1 | 8/2019 | Zhou et al. |
| 2019/0261344 A1 | 8/2019 | Grant et al. |
| 2020/0259703 A1 | 8/2020 | Cirik et al. |
| 2020/0280408 A1* | 9/2020 | Nilsson .................... H04B 7/10 |
| 2020/0350972 A1 | 11/2020 | Yi et al. |
| 2020/0359247 A1 | 11/2020 | Yi et al. |
| 2021/0021322 A1 | 1/2021 | Kuo et al. |
| 2021/0160880 A1 | 5/2021 | Zhang et al. |
| 2022/0103235 A1* | 3/2022 | Raghavan .............. H04B 7/088 |

OTHER PUBLICATIONS

International Search Report and Written Opinion—PCT/US2021/056216—ISA/EPO—dated Jan. 31, 2022.

* cited by examiner

TECHNIQUES FOR INDICATING PREFERRED BEAMS IN MULTI-TRANSMISSION AND RECEPTION POINT (MULTI-TRP) SYSTEMS BASED ON DEFAULT OPERATING FREQUENCY (DOF) MISMATCH

CROSS REFERENCE

The present Application for Patent claims the benefit of U.S. patent application Ser. No. 17/104,435 by RAGHAVAN et al., entitled "TECHNIQUES FOR INDICATING PREFERRED BEAMS IN MULTI-TRANSMISSION AND RECEPTION POINT (MULTI-TRP) SYSTEMS BASED ON DEFAULT OPERATING FREQUENCY (DOF) MISMATCH," filed Nov. 25, 2020, assigned to the assignee hereof, and expressly incorporated by reference in its entirety herein.

TECHNICAL FIELD

The following relates to wireless communications, including techniques for indicating beams in multi-transmission and reception point (multi-TRP) systems based on a default operating frequency (DOF) mismatch.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with multiple transmission and reception points (TRPs) in a multi-TRP deployment. The UE may communicate with the multiple TRPs according to a beamforming technique in which the UE and the multiple TRPs communicate with each other via one or more directional beams.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving a control message indicating a first set of default operating frequencies (DOFs) for a first set of ports associated with a first transmission and reception point (TRP) and a second set of DOFs for a second set of ports associated with a second TRP and transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in an apparatus for wireless communications at a UE. The apparatus may include a first interface, a second interface, and a processing system. The first interface may be configured to obtain a control message indicating a first set of DOFs for a first set of ports associated with a first TRP and a second set of DOFs for a second set of ports associated with a second TRP. The first interface or a second interface may be further configured to output or obtain beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive a control message indicating a first set of DOFs for a first set of ports associated with a first TRP and a second set of DOFs for a second set of ports associated with a second TRP and transmit or receive beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in another apparatus for wireless communications at a UE. The apparatus may include means for receiving a control message indicating a first set of DOFs for a first set of ports associated with a first TRP and a second set of DOFs for a second set of ports associated with a second TRP and means for transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in a non-transitory computer-readable medium storing code for wireless communications at a UE. The code may include instructions executable by a processor to receive a control message indicating a first set of DOFs for a first set of ports associated with a first TRP and a second set of DOFs for a second set of ports associated with a second TRP and transmit or receive beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

In some implementations, transmitting or receiving the beam selection signaling, as implemented in the method, apparatuses, and non-transitory computer-readable medium described herein, can include operations, features, means, or instructions for transmitting or receiving an indication of the first beam associated with the first port and the second beam associated with the second port based on a first mismatch between a first DOF associated with the first port and a DOF of the UE being within a threshold mismatch and a second mismatch between a second DOF associated with the second port and the DOF of the UE being within the threshold mismatch.

In some implementations, transmitting or receiving the beam selection signaling, as implemented in the method, apparatuses, and non-transitory computer-readable medium described herein, can include operations, features, means, or instructions for transmitting or receiving an indication of a first mismatch between a first DOF associated with the first port and a DOF of the UE and a second mismatch between a second DOF associated with the second port and the DOF of the UE.

In some implementations, transmitting or receiving the beam selection signaling, as implemented in the method, apparatuses, and non-transitory computer-readable medium described herein, can include operations, features, means, or instructions for transmitting or receiving the beam selection signaling indicating a receive beam pair of the UE for receiving a multi-TRP transmission from the first TRP and the second TRP.

In some implementations, the method, apparatuses, and non-transitory computer-readable medium described herein may further include operations, configurations, features, means, or instructions for receiving the multi-TRP transmission from the first TRP and the second TRP via the receive beam pair of the UE.

In some implementations, receiving the multi-TRP transmission from the first TRP and the second TRP, as implemented in the method, apparatuses, and non-transitory computer-readable medium described herein, can include operations, features, means, or instructions for receiving the multi-TRP transmission from the first TRP via at least the first beam over a first band and from the second TRP via at least the second beam over a second band, where the first band and the second band include ultra-wideband frequency bands.

In some implementations, transmitting or receiving the beam selection signaling, as implemented in the method, apparatuses, and non-transitory computer-readable medium described herein, can include operations, features, means, or instructions for transmitting or receiving the beam selection signaling indicating a transmit beam pair of the UE for transmitting a multi-TRP transmission to the first TRP and the second TRP.

In some implementations, the method, apparatuses, and non-transitory computer-readable medium described herein may further include operations, configurations, features, means, or instructions for transmitting the multi-TRP transmission to the first TRP via a first transmit beam of the transmit beam pair and to the second TRP via a second transmit beam of the transmit beam pair.

In some implementations, the method, apparatuses, and non-transitory computer-readable medium described herein may further include operations, configurations, features, means, or instructions for receiving a first one or more downlink reference signals from the first TRP via a first one or more ports of the first set of ports and a second one or more downlink reference signals from the second TRP via a second one or more ports of the second set of ports, where the beam selection signaling may be based on the first one or more downlink reference signals and the second one or more downlink reference signals.

In some implementations, the method, apparatuses, and non-transitory computer-readable medium described herein may further include operations, configurations, features, means, or instructions for transmitting a first one or more uplink reference signals to the first TRP and a second one or more uplink reference signals to the second TRP, where the beam selection signaling may be based on the first one or more uplink reference signals and the second one or more uplink reference signals.

In some implementations, transmitting or receiving the beam selection signaling, as implemented in the method, apparatuses, and non-transitory computer-readable medium described herein, can include operations, features, means, or instructions for transmitting or receiving an indication of the first beam associated with the first port and the second beam associated with the second port based on an out-band-emission associated with each of the first beam and the second beam satisfying a threshold on out-of-band emissions.

One innovative aspect of the subject matter described in this disclosure can be implemented in a method for wireless communications at a first TRP. The method may include transmitting, to a UE, a control message indicating a first set of DOFs for a first set of ports associated with the first TRP and a second set of DOFs for a second set of ports associated with a second TRP and transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in an apparatus for wireless communications at a first TRP. The apparatus may include a first interface, a second interface, and a processing system. The first interface may be configured to output, to a UE, a control message indicating a first set of DOFs for a first set of ports associated with the first TRP and a second set of DOFs for a second set of ports associated with a second TRP. The first interface or a second interface may be further configured to output or obtain beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in another apparatus for wireless communications at a first TRP. The apparatus may include a processor, memory coupled with the processor, and instructions stored in the memory. The instructions may be executable by the processor to cause the apparatus to transmit, to a UE, a control message indicating a first set of DOFs for a first set of ports associated with the first TRP and a second set of DOFs for a second set of ports associated with a second TRP and transmit or receive beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in another apparatus for wireless communications at a first TRP. The apparatus may include means for transmitting, to a UE, a control message indicating a first set of DOFs for a first set of ports associated with the first TRP and a second set of DOFs for a second set of ports associated with a second TRP and means for transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

Another innovative aspect of the subject matter described in this disclosure can be implemented in a non-transitory computer-readable medium storing code for wireless communications at a first TRP. The code may include instructions executable by a processor to transmit, to a UE, a control message indicating a first set of DOFs for a first set of ports associated with the first TRP and a second set of DOFs for a second set of ports associated with a second TRP and transmit or receive beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

In some implementations, transmitting or receiving the beam selection signaling, as implemented in the method, apparatuses, and non-transitory computer-readable medium described herein, can include operations, features, means, or instructions for transmitting or receiving an indication of the first beam associated with the first port and the second beam associated with the second port based on a first mismatch between a first DOF associated with the first port and a DOF of the UE being within a threshold mismatch and a second mismatch between a second DOF associated with the second port and the DOF of the UE being within the threshold mismatch.

In some implementations, transmitting or receiving the beam selection signaling, as implemented in the method, apparatuses, and non-transitory computer-readable medium described herein, can include operations, features, means, or instructions for transmitting or receiving an indication of a first mismatch between a first DOF associated with the first port and a DOF of the UE and a second mismatch between a second DOF associated with the second port and the DOF of the UE.

In some implementations, transmitting or receiving the beam selection signaling, as implemented in the method, apparatuses, and non-transitory computer-readable medium described herein, can include operations, features, means, or instructions for transmitting or receiving the beam selection signaling indicating a receive beam pair of the UE for receiving a multi-TRP transmission from the first TRP and the second TRP.

In some implementations, the method, apparatuses, and non-transitory computer-readable medium described herein may further include operations, configurations, features, means, or instructions for transmitting, to the UE and jointly with the second TRP, the multi-TRP transmission via a receive beam at the UE of the receive beam pair using at least the first beam associated with the first port.

In some implementations, transmitting the multi-TRP transmission to the UE, as implemented in the method, apparatuses, and non-transitory computer-readable medium described herein, can include operations, features, means, or instructions for transmitting the multi-TRP transmission over a first band different from a second band over which the second TRP transmits the multi-TRP transmission, where the first band and the second band include ultra-wideband frequency bands.

In some implementations, transmitting or receiving the beam selection signaling, as implemented in the method, apparatuses, and non-transitory computer-readable medium described herein, can include operations, features, means, or instructions for transmitting or receiving the beam selection signaling indicating a transmit beam pair of the UE for transmitting a multi-TRP transmission to the first TRP and the second TRP.

In some implementations, the method, apparatuses, and non-transitory computer-readable medium described herein may further include operations, configurations, features, means, or instructions for receiving, from the UE, the multi-TRP transmission via a transmit beam of the transmit beam pair of the UE using at least the first beam associated with the first port.

In some implementations, the method, apparatuses, and non-transitory computer-readable medium described herein may further include operations, configurations, features, means, or instructions for transmitting one or more downlink reference signals via one or more ports of the first set of ports, where the beam selection signaling may be based on the one or more downlink reference signals.

In some implementations, the method, apparatuses, and non-transitory computer-readable medium described herein may further include operations, configurations, features, means, or instructions for receiving one or more uplink reference signals from the UE at one or more ports of the first set of ports, where the beam selection signaling may be based on the one or more uplink reference signals.

In some implementations, transmitting or receiving the beam selection signaling, as implemented in the method, apparatuses, and non-transitory computer-readable medium described herein, can include operations, features, means, or instructions for transmitting or receiving an indication of the first beam associated with the first port and the second beam associated with the second port based on an out-band-emission associated with each of the first beam and the second beam satisfying a threshold on out-of-band emissions.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
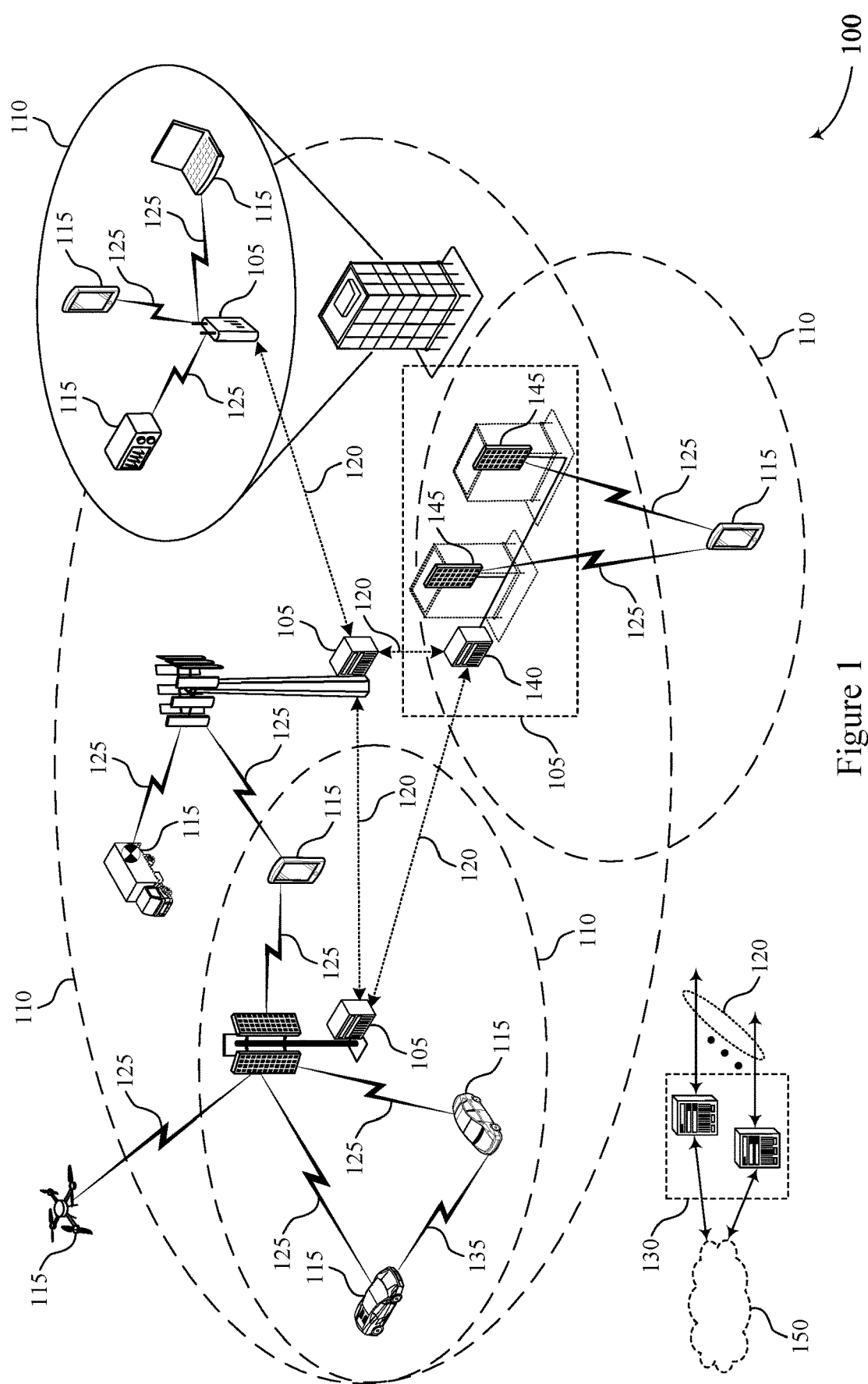
FIGS. 1 and 2 illustrate examples of wireless communications systems that support techniques for indicating beams in multi-transmission and reception point (multi-TRP) systems based on a default operating frequency (DOF) mismatch.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a UE may communicate with multiple transmission and reception points (TRPs) in a multi-TRP deployment. For example, the UE may communicate with at least two TRPs including a first TRP and a second TRP according to a multi-TRP communication technique. In some examples, the UE may communicate with the first TRP and the second TRP over various radio frequency spectrum bands that support ultra-wide bandwidth operation, such as FR2 (which may include frequencies between 24.25-52.6 GHz) or FR4 (which may include frequencies between 52.6 GHz-114.25 GHz) radio frequency spectrum bands. In such examples, the UE, the first TRP, or the second TRP may tune a radio frequency chain of their respective antenna subarrays, panels, ports, or modules to a default operating frequency (DOF). For example, the UE, the first TRP, or the second TRP may tune or optimize a respective analog or radio frequency beamforming codebook for some carrier frequency within the ultra-wide bandwidth over which the UE, the first TRP, and the second TRP may communicate. Such a carrier frequency may be referred to herein as a DOF (a frequency for which an antenna array is tuned or optimized relative to other frequencies within the ultra-wide bandwidth). Further, each of the UE, the first TRP, and the second TRP may configure multiple antenna ports, antenna modules, or antenna elements at the respective device with different DOFs, such that each device may support different DOFs at different antenna ports, antenna modules, or antenna elements.

In some implementations of the present disclosure, the UE may select to communicate with one or both of the first TRP or the second TRP and may indicate a set of beams that the first TRP or the second TRP, or both, may use to communicate with the UE based on a DOF mismatch between an antenna port of the first TRP or the second TRP and at least one antenna module of the UE. For example, the UE may receive, from one or both of the first TRP or the second TRP, an indication of a DOF of each antenna port of the first TRP and the second TRP and the UE may select the set of beams that correspond to (for example, are formed from) an antenna port having a DOF that is within a threshold DOF mismatch of a DOF of at least one antenna module of the UE. In other words, if the first TRP transmits a first beam from a first port having a first DOF that is received at a first antenna module of the UE having a second DOF within the threshold DOF mismatch of the first DOF, the UE may select the first beam for communication between the first TRP and the UE. The UE may similarly select and indicate a beam for the second TRP to use for communication between the second TRP and the UE and, in some implementations, the first TRP and the second TRP may use the indicated beams for joint communication between the TRPs and the UE.

In some aspects, the UE may select and indicate the set of beams during a synchronization/initial acquisition or an access or a beam refinement procedure with the first TRP and the second TRP. For example, the UE may receive a number of downlink reference signals (such as synchronization signal blocks (SSBs) or channel state information reference signals (CSI-RSs), among other examples) from the first TRP and the second TRP via each of the antenna ports of the first TRP and the second TRP. Based on the indication of the DOF of each antenna port of the first TRP and the second TRP and a signal strength of the downlink reference signals at least at one antenna module of the UE, the UE may identify a set of beams that the first TRP and the second TRP may use for joint communications with the UE. For instance, the UE may receive a first SSB (which may correspond to the first beam) from the first port of the first TRP at the first antenna module of the UE, the first port configured with the first DOF and the first antenna module of the UE configured with the second DOF, and if the UE determines that the first DOF and the second DOF are similar (for example, within the threshold DOF mismatch or within a threshold range of each other), the UE may transmit an indication of the first port to indicate to the first TRP to use the first beam for communication with the UE. In some implementations, the UE may indicate the first port based on transmitting an indication of a transmission configuration indicator (TCI) state corresponding to the first port.

Particular aspects of the subject matter described in this disclosure can be implemented to realize one or more of the following potential advantages. The described techniques may be implemented to establish more robust and reliable communication links between the UE, the first TRP, and the second TRP in a multi-TRP deployment. For example, based on indicating the set of beams that the first TRP and the second TRP may use for joint communication with the UE based on a DOF mismatch between antenna ports of the first TRP and the second TRP and antenna modules of the UE, the UE and the TRPs may communicate using beams from antenna ports or modules having similarly tuned radio frequency chains. This use of similarly tuned radio frequency chains may increase the signal strength of communication between the UE and the TRPs, which in turn may increase the likelihood for successful communication between the UE and the TRPs. As such, the UE, the first TRP, and the second TRP, may experience greater connectivity, higher data rates, increased throughput, or greater spectral efficiency, among other benefits. Some aspects of the subject matter described in this disclosure also may be used for more reliable information conveyance as diversity benefits can be improved by DOF matching at the TRPs and the UE.

FIG. 1 illustrates an example of a wireless communications system 100 that supports techniques for indicating beams in multi-TRP point systems based on a DOF mismatch. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (such as via an S1, N2, N3, or another interface). The base stations 105 may communicate with one another over the backhaul links 120 (such as via an X2, Xn, or other interface) either directly (such as directly between base stations 105), or indirectly (such as via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (such as over a carrier) and may be associated with an identifier for distinguishing neighboring cells (such as a physical cell identifier (PCID), a virtual cell identifier (VCID), or others). In some examples, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (such as MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1-M) system in which each UE 115 transmits to every other UE 115 in the group. In some examples, a base station 105 facilitates the scheduling of resources for D2D communications. In some other examples, D2D communications are carried out between the UEs 115 without the involvement of a base station 105.

In some systems, the D2D communication link 135 may be an example of a communication channel, such as a sidelink communication channel, between vehicles (such as UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (such as base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a base station 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as by a base station 105 or a UE 115) may be performed using multiple beam directions, and the device may use a combination of digital precoding or radio frequency beamforming to generate a combined beam for transmission (such as from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as a cell-specific reference signal (CRS), a CSI-RS, which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

As demand for communication resources increases due to an increasing number of wireless devices communicating over the available spectrum, techniques to increase throughput efficiently and reliably are desirable. Communicating devices (such as UEs 115 and base stations 105) may use additional frequency ranges and the communicating devices may achieve greater throughput based on using such additional frequency ranges. In some aspects, such additional frequency ranges may refer to relatively higher frequency ranges. Higher frequency ranges, such as FR2 radio frequency spectrum band including millimeter wave (mmW) frequency ranges (for example, frequencies above 6 GHz, such as frequencies between 24.25-52.6 GHz) and FR4 radio frequency spectrum band including upper-mmW frequency ranges (such as frequencies between 52.6 GHz-114.25 GHz), may be employed for wireless communications between multiple devices, and transmitting at these higher frequencies may include transmitting at shorter wavelengths and, in some examples, according to beamforming techniques. For instance, based on transmitting at shorter wavelengths, signals carried by the FR2 or the FR4 radio frequency spectrum bands may be more susceptible to the impacts of interference or path loss and transmitting or receiving devices, or both, may employ beamforming techniques to increase the signal strength of such signals carried by the FR2 or the FR4 radio frequency spectrum bands. Further, frequency ranges beyond FR4 are not precluded in this disclosure (such as 114.25-300 GHz which may be referred to as "sub-THz" bands).

A UE 115 may employ such beamforming techniques at one or more antenna modules of the UE 115. For example, the UE 115 may transmit or receive signals directionally at an antenna module based on tuning a radio frequency chain connected to or coupled with the antenna module using a set of phase shifters and gain control stages. In some examples, the UE 115 may use a single set of phase shifters and gain controls for each antenna module of the UE 115 and, as such, analog or radio frequency beamforming may be constrained (for example, may be limited by the single set of phase shifters), which may lead to poor performance at some frequencies in examples in which the UE 115 is communicating over the FR2 or the FR4 radio frequency spectrum bands. For example, such constrained analog or radio frequency beamforming may lead to poor performance in examples in which the UE 115 is communicating over an ultra-wide bandwidth. In some examples, the UE 115 may tune or optimize an analog or radio frequency beamforming codebook of the UE 115 or of an antenna module of the UE 115 for some carrier frequency over the FR2 or the FR4 radio frequency spectrum band (over the ultra-wide bandwidth of interest), and such a carrier frequency may be referred to herein as a DOF. In some examples, the UE 115 may operate multiple antenna modules, each with a different analog or radio frequency beamforming codebook, and the UE 115 may configure each antenna module with a DOF (such that the DOFs of the multiple antenna modules of the UE may be the same or may be different).

Similarly, a base station 105, which may be an example of or function as a TRP, may employ such beamforming techniques at one or more antenna panels or antenna ports of the base station 105 based on tuning a radio frequency chain connected to or coupled with an antenna panel or antenna port using a set of phase shifters and gain controls. The base station 105 may tune or optimize an analog or radio frequency beamforming codebook of the base station 105 or of an antenna panel or port of the base station 105 for some carrier frequency over the FR2 or the FR4 radio frequency spectrum band (over the ultra-wide bandwidth of interest), and, as described herein, such a carrier frequency may be referred to herein as a DOF. In some examples, the base station 105 may operate multiple antenna panels or ports and the base station 105 may configure each antenna panel or port with a DOF (such that the DOFs of the multiple antenna panels or ports of the base station 105 may be the same or may be different).

The UE 115 and the base station 105 may configure their respective radio frequency chains or ports with varying DOFs, such that a first DOF configured at a first antenna module of the UE 115 may be different than a second DOF of a first port of the base station 105. Such variation in DOF between the UE 115 and the base station 105 may influence the likelihood for the UE 115 and the base station 105 to successfully communicate with each other. For example, if the first DOF of the first antenna module of the UE 115 is greater than a threshold difference from the second DOF of the first port of the base station 105, the UE 115 or the base station 105 may be unable to detect or receive signaling in examples in which they communicate via the first antenna module of the UE 115 and the first port of the base station 105 (due to signal strength distortions), which may result in communication failures or loss in performance (such as data rate or reliability, among other examples) between the UE 115 and the base station 105.

In some implementations of the present disclosure, the UE 115 in a multi-TRP deployment may select two or more TRPs for communication with a network based on the DOFs configured at the ports of the TRPs. Additionally, in some examples, the UE 115 may transmit beam selection signaling to indicate one or more beams for each TRP to use for joint/multi-TRP communication with the UE 115 based on the variation in DOF between the UE 115 and the TRP. For example, the UE 115 may transmit an indication to one or more of the two or more selected TRPs of the set of candidate beams and each beam of the set of candidate beams may be associated with a port of a TRP of the selected TRPs that has a DOF within a threshold difference of a DOF of the UE 115. The UE 115 may apply such techniques for refining a beam training or selection procedure based on a DOF mismatch between the UE 115 and a TRP to scenarios in which the UE 115 communicates with multiple TRPs in a multi-TRP deployment, in which the UE 115 may receive joint transmissions from or perform joint transmissions to multiple TRPs. Additional details relating to such extension of beam selection based on a DOF mismatch to multi-TRP deployments are described herein, including with reference to FIGS. 2 and 3.

Figure 2:
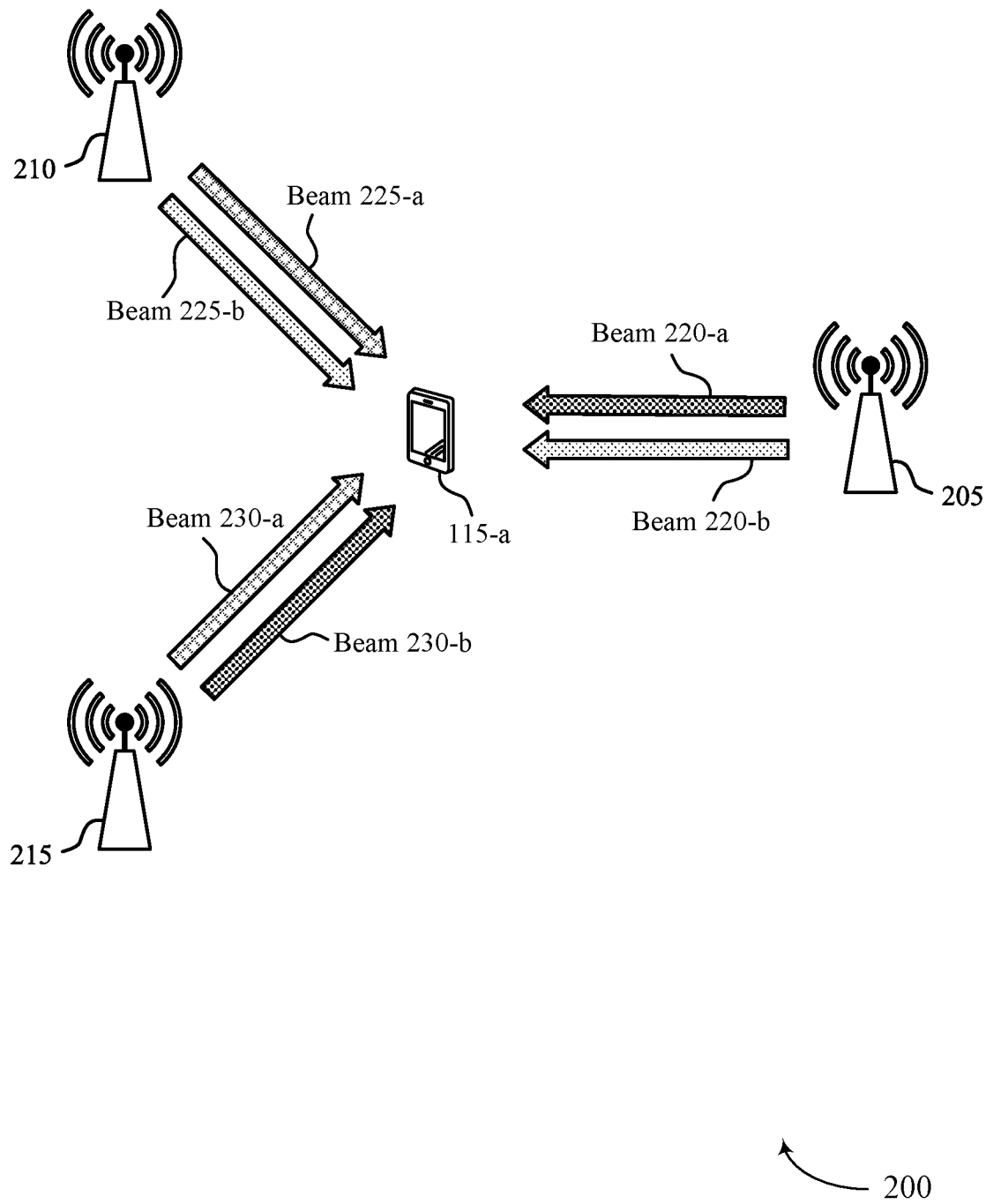

FIG. 2 illustrates an example of a wireless communications system 200 that supports techniques for indicating beams in multi-TRP systems based on a DOF mismatch. The wireless communications system 200 may implement aspects of the wireless communications system 100. For example, the wireless communications system 200 illustrates communication between a UE 115-a, a TRP 205, a TRP 210, and a TRP 215, which may be examples of corresponding devices described herein, including with reference to FIG. 1. In some implementations, the UE 115-a may transmit beam selection signaling to one or more of the TRPs in the wireless communications system 200 to indicate a selection of two or more of the TRPs for joint/multi-TRP communication with the UE 115-a and which beams the selected TRPs may use for the joint/multi-TRP communication with the UE 115-a based on a DOF mismatch between the beams (or corresponding antenna ports) of the TRPs and at least one antenna module of the UE 115-a.

In accordance with this selection, the UE 115-a may communicate with one or more of the TRP 205, the TRP 210, or the TRP 215. The TRPs in the wireless communications system 200 may be examples of distinct entities in the network or may be distinct entities that are mapped to a same (or similar) logical identifier (ID) or logical entity. For instance, in examples in which the TRPs in the wireless communications system 200 are distinct entities and mapped to the same logical ID, a connection between the UE 115-a and the TRP 205 and a connection between the UE 115-a and the TRP 210 may be understood as connections to the same logical ID. In such examples in which the TRP 205 and the TRP 210 are mapped to the same logical ID, the TRP 205 and the TRP 210 may communicate via a fiber connection (such as a "high-end" fiber or wired backhaul connection) and may coordinate via the fiber connection. In some other examples, the TRPs in the wireless communications system 200 may be mapped to different logical IDs and, as such, may be unable to coordinate via such "high-end" fiber or wired backhaul connections. In other words, coordination between TRPs mapped to different logical IDs may be less (less information is shared or information is shared less frequently, among other examples) than coordination between TRPs mapped to a same logical ID.

In some examples, the UE 115-*a* may receive or transmit a joint/multi-TRP transmission to or from two or more of the TRP 205, the TRP 210, or the TRP 215. For instance, in examples in which the UE 115-*a* operates in a multi-TRP deployment or in a multi-TRP system, the UE 115-*a* may receive a joint transmission from multiple (two or more) TRPs simultaneously. In such examples, the multiple TRPs participating in the multi-TRP transmission may coordinate (via wired or wireless backhaul links) the multi-TRP transmission from each TRP such that the UE 115-*a* receives the multi-TRP transmission from the multiple TRPs simultaneously. Similarly, the UE 115-*a* may transmit to multiple TRPs simultaneously. Such joint transmission within a multi-TRP system may increase the likelihood for successful communication between the UE 115-*a* and any one of the multiple TRPs with which the UE 115-*a* communicates. For instance, in examples in which the UE 115-*a* communicates over higher radio frequencies, such as mmW radio frequencies, some systems may support higher densification of TRPs and joint transmission from multiple TRPs may increase a signal strength at the UE 115-*a* based on the combining effects at the receive antennas of the UE 115-*a*. Additionally, in some examples, such joint transmission from multiple TRPs may increase reliability of communications between the UE 115-*a* and the multiple TRPs.

The UE 115-*a*, the TRP 205, the TRP 210, and the TRP 215 may communicate over one or more radio frequency spectrum bands, such as FR2 or FR4 radio frequency spectrum bands. The FR4 radio frequency spectrum band, which may be referred to as "upper mmW bands" or as radio frequencies in the "sub-THz regime," may have shorter wavelengths λ than the FR2 radio frequency spectrum band. For example, the FR2 radio frequency spectrum band may include frequencies between 24.25-52.6 GHz and the FR4 radio frequency spectrum band may include frequencies between 52.6 GHz-114.25 GHz. The frequency range from 114.25-300 GHz are sometimes labeled as "sub-THz." In some implementations, because frequencies in the FR4 radio frequency spectrum band have shorter wavelengths than frequencies in the FR2 radio frequency spectrum band, more antenna elements may be packed into a same physical aperture in examples in which a device is configured to communicate over the FR4 radio frequency spectrum band than in examples in which the device is configured to communicate over the FR2 radio frequency spectrum band, which may result in larger antenna arrays (a greater number of antenna elements) in examples in which the device is configured to communicate over the FR4 radio frequency spectrum band. As demand for greater throughput and capacity continue, extensions to higher radio frequency spectrum bands, such as an FR5 radio frequency spectrum band, may be possible, which may result in still larger antenna arrays.

Devices operating in the FR2 or FR4 radio frequency spectrum bands may use a portion or a subset of the full radio frequency spectrum band. For example, a device operating over the FR4 radio frequency spectrum band may receive an allocation of a subset frequency range within the 52.6-114.25 GHz frequency range. Such a subset frequency range in the FR2 or the FR4 radio frequency spectrum bands may be relatively wider than frequency allocations in other radio frequency spectrum bands and, as such, may be referred to herein as an ultra-wide bandwidth. For instance, an approximately 14 GHz wide bandwidth (such as a 14 GHz subset of the FR4 radio frequency spectrum band) may be available to devices across multiple geographies and, in some examples, a device communicating over such an ultra-wide bandwidth may experience performance and beamforming gains (such as greater throughput). In some aspects, a device may receive an allocation of such a 14 GHz wide bandwidth from 57-71 GHz.

Some devices may use a single radio frequency chain to communicate over the ultra-wide bandwidth (such as an approximately 14 GHz bandwidth range) and, because such devices may use a single set of phase shifters for a single radio frequency chain, analog or radio frequency beamforming may be constrained (or limited to some carrier frequencies) based on the use of a single radio frequency chain, which may result in poor performance at some frequencies. Such poor performance at some frequencies as a result of limited analog or radio frequency beamforming may be referred to as "beam squinting." Further, some devices may tune or optimize their radio frequency chain (for example, an analog or radio frequency beamforming codebook) for some carrier frequency, which may be referred to herein as a DOF, over the ultra-wide bandwidth of interest (such as the 14 GHz wide bandwidth from 57-71 GHz).

As such, the devices may experience a greater likelihood for successful communications with another device that is also using a same or similar DOF. In other words, a DOF may correspond to a frequency for which a radio frequency chain is tailored in terms of peak (or increased) beamforming array gain relative to other frequencies within an ultra-wide bandwidth frequency allocation. Additionally, the DOF of a node or device also may be referred to as a metric that captures the frequency whose half wavelength is equal to the inter-element spacing on an antenna array or panel in operation. For example, for some wavelength λ, an inter-element spacing may be d=λ/2 and the corresponding DOF may be equal to c/λ=c/2d, in which c refers to the speed of light. As such, an antenna panel of a device may have a DOF based on the designed or configured inter-element spacing of the antenna panel, and the device may adjust or tailor the DOF of the antenna panel based on configuring or tuning a radio frequency chain of the (coupled to) antenna array or panel.

A DOF may be device- and radio frequency chain-specific and may be unknown at a device at the other end of a link. For example, the UE 115-*a* may tune or optimize an analog or radio frequency codebook of the UE 115-*a* for a first DOF and the TRP 205, the TRP 210, and the TRP 215 may be unaware of the first DOF used by the UE 115-*a*. Accordingly, in some examples, communicating devices may signal (for example, broadcast) or otherwise share information relating to configured DOFs. In some aspects, the signaling may be from TRP or base station to UE 115. In some other aspects, the signaling may be from UE 115 to TRP or base station.

Communication over such an ultra-wide bandwidth using more specific or granular DOFs, however, may potentially result in DOF mismatches between devices (such as between the UE 115-*a*, the TRP 205, the TRP 210, and the TRP 215). For example, different devices or nodes (such as base stations, TRPs, UEs 115, customer premises equipment (CPE), relay nodes, repeater nodes, or IAB nodes) may have different DOFs. For example, the UE 115-*a*, the TRP 205, the TRP 210, and the TRP 215 may each configure ports at the respective device with (at least partially) different DOFs. For instance, the TRP 205 may configure a first port of the TRP 205 with a DOF 235 and may configure a second port of the TRP 205 with a DOF 240. Similarly, the TRP 210 may configure a first port of the TRP 210 with a DOF 245 and may configure a second port of the TRP 210 with the DOF 240 and the TRP 215 may configure a first port of the TRP 215 with the DOF 245 and may configure a second port of the TRP 215 with the DOF 235. Further, although shown as each sharing some common DOFs, the TRP 205, the TRP 210, and the TRP 215 may configure the respective ports of the TRP 205, the TRP 210, and the TRP 215 such that the configured DOFs are all different from each other without exceeding the scope of the present disclosure.

In some examples, intra-cell multi-TRP communications with a same cell identifier (ID) and inter-cell multi-TRP communications may operate over a same radio frequency spectrum band or a same component carrier. For example, either intra-cell or inter-cell multi-TRP communications may operate over a same FRx in which x=1, 2, 3, 4, or 5, such that FR3 may include 7.125-24.25 GHz and FR4 may include 52.6-114.25 GHz. Further, the FR4 radio frequency band may include a subset frequency band referred to as FR4-1a, which may include the frequencies between 52.6-71 GHz of the 52.6-114.25 GHz included within the FR4 radio frequency spectrum band. The TRPs (such as two or more of the TRP 205, the TRP 210, and the TRP 215) may coordinate via wired or wireless backhaul connections and transmit a same symbol in a diverse manner from different (non-co-located) TRPs. Such a same symbol transmission from different TRPs based on backhaul coordination may be referred to herein as a joint transmission or a joint/multi-TRP transmission. In such examples in which multi-TRP communications operate over a same FR, the TRPs or the UE 115-a may select which beams to use for communication between the TRPs and the UE 115-a based on one or more signal strength measurements, such as reference signal received power (RSRP) measurements. In some examples, however, RSRP measurements may be narrowband-based measurements and the UE 115-a may have difficulty measuring RSRP for wide bandwidth communications, such as the ultra-wide bandwidth communications that may be present in the FR2, the FR4, or the FR5/"sub-THz" radio frequency spectrum bands.

In some other examples, however, the TRPs may communicate over different radio frequency spectrum bands or different component carriers (as opposed to the same radio frequency spectrum band or a same component carrier) such that joint/multi-TRP communications may be carried over the different radio frequency spectrum bands. For example, in some scenarios, the TRPs may communicate over different radio frequency spectrum bands, such that some TRPs may communicate over FRx and some other TRPs may communicate over FRy (in which x or y=1, 2, 3, 4, or 5). Similarly, a TRP may communicate over multiple radio frequency spectrum bands (such that one TRP may operate a first antenna panel or port at FRx and a second antenna panel or port at FRy).

In examples in which either FRx or FRy supports or otherwise includes ultra-wide bandwidth operation (such as 24-48 GHz which may occur over FR2 or 57-71 GHz which may occur over FR4-1a), the corresponding TRP may configure a DOF for each of the subarrays or panels used to transmit or receive signals at the TRP side of the communication link. The UE 115-a, on the other end of the link, also may configure each of a number of antenna modules with a DOF within either of the FRx or the FRy radio frequency spectrum bands (for example, based on a capability of the UE 115-a) for communication (transmit or receive) operations at the UE 115-a. Accordingly, based on the radio frequency spectrum bands over which multiple TRPs and the UE 115-a may communicate, the choice or configuration of a DOF may vary across radio frequency chains or ports at the multiple TRPs and may vary across radio frequency chains, ports, or antenna modules at the UE 115-a.

As such, and based on the ultra-wide bandwidth operation over either or both of the FRx or the FRy radio frequency spectrum band, the DOF and the beams used to communicate between the UE 115-a and the multiple TRPs may be mismatched, which may result in a lower likelihood of successful communications between the UE 115-a and the multiple TRPs. For instance, in examples in which the TRP 205 is operating at the DOF 235 and the DOF 240 within the FRx radio frequency spectrum band and a first antenna module of the UE 115-a is operating at a DOF within the FRy radio frequency spectrum band, and if the communication link between the TRP 205 and the UE 115-a is via the first antenna module, communication between the TRP 205 and the UE 115-a may have a lower likelihood of being successfully received and decoded as compared to examples in which the DOF 235 or the DOF 240 and the DOF of the UE 115-a are relatively similar or within a threshold range of each other. In other words, mismatches in DOF may result in array gain deterioration in communications relative to examples in which DOFs are matched (or within a threshold difference of each other).

In some implementations of the present disclosure, the UE 115-a may determine which TRPs to connect to based on the DOF mismatch between each of the multiple TRPs and the UE 115-a. For example, the UE 115-a may receive, from one or more of the TRP 205, the TRP 210, or the TRP 215, one or more control messages indicating the DOFs supported at each of the TRP 205, the TRP 210, and the TRP 215 and the UE 115-a may select to communicate with one or more of the TRP 205, the TRP 210, or the TRP 215 based on which of the TRPs support a DOF that is within a threshold range or mismatch of one or more DOFs supported at the UE 115-a. Additionally, in some examples, the UE 115-a and the multiple TRPs may perform beam sweeping (across both the FRx and the FRy radio frequency spectrum bands) and may signal or otherwise indicate a set of selected beams for joint/multi-TRP communication based on a DOF mismatch between each of the multiple TRPs and the UE 115-a and the beam sweeping.

For example, each of the TRP 205, the TRP 210, and the TRP 215 may transmit one or more downlink reference signals (such as SSBs or CSI-RSs, among other examples) via different directional beams towards the UE 115-a, and the UE 115-a may determine which beams the TRPs may use to communicate with the UE 115-a based on a signal strength of a received downlink reference signal as well as a DOF of a port of a TRP from which the downlink reference signal is transmitted. For instance, the TRP 205 may operate two ports, including a first port configured to the DOF 235 and a second port configured to the DOF 240, and the TRP 205 may transmit one or more SSBs via each port over various beams 220, such as a beam 220-a from the first port and a beam 220-b from the second port. Similarly, the TRP 210 may operate two ports, including a first port configured to the DOF 245 and a second port configured to the DOF 240, and the TRP 210 may transmit one or more SSBs via each port over various beams 225, such as a beam 225-a from the first port and a beam 225-b from the second port. Similarly, the TRP 215 may operate two ports, including a first port configured to the DOF 245 and a second port configured to the DOF 235, and the TRP 215 may transmit one or more SSBs via each port over various beams 230, such as a beam 230-a from the first port and a beam 230-b from the second port. In other words, each of the multiple TRPs within the multi-TRP system may sweep across a number of SSBs within some frequency range or around some DOFs.

In some examples, the UE 115-*a* may receive, from one or more of the multiple TRPs, a mapping (such as a logical mapping) between SSBs and the UE 115-*a* may determine a cell ID based on receiving and decoding the SSBs. For example, each SSB may include a primary synchronization signal (PSS), a secondary synchronization signal (SSS), and a physical broadcast channel (PBCH) including a master information block (MIB) and one or more system information blocks (SIBs) (such as a SIB1, a SIB2, and so on). The cell ID may be a function of the MIB, the SIB1, and the SIB2 and the UE 115-*a* may determine the cell ID corresponding to the TRP from which the UE 115-*a* received the SSB based on decoding the MIB, the SIB1, and the SIB2. As such, the UE 115-*a* may determine or otherwise identify which TRP the UE 115-*a* is receiving the SSB from and, if the UE 115-*a* determines that the TRP is one of the TRPs that the UE 115-*a* selects for communication based on the DOF mismatch, the UE 115-*a* may use the received SSB to identify which beam the TRP is using to transmit to the UE 115-*a*.

For example, each SSB may include an SSB index associated with a beam direction of the SSB and the UE 115-*a* may identify the beam used by the TRP based on the SSB index. In some implementations, the UE 115-*a* may determine which port the TRP uses to transmit the beam to the UE 115-*a* and the UE 115-*a* may refine its beam selection based on a mismatch between a DOF of the port and a DOF of a receiving antenna module of the UE 115-*a*. As such, the UE 115-*a* may select TRPs with which the UE 115-*a* may connect as well as over which ports of the selected TRPs the UE 115-*a* and the selected TRPs may communicate based on a DOF mismatch.

For instance, in some examples, the UE 115-*a* may have a DOF approximate or similar to (within a threshold mismatch from) the DOF 240 and, accordingly, may determine to communicate with the TRP 205 and the TRP 210 (because the TRP 205 and the TRP 210 operate at the DOF 240 for at least one port). In such examples, the UE 115-*a* may transmit the beam selection signaling indicating that the UE 115-*a* may establish a connection with the TRP 205 and the TRP 210 and indicating that the TRP 205 may use the beam 220-*b* and that the TRP 210 may use the beam 225-*b* to communicate with the UE 115-*a*. Additionally, in some examples, the UE 115-*a* may transmit, within or in addition to the beam selection signaling, an indication of the difference between the DOF of the UE 115-*a* and the DOF 240 supported by the TRP 205 and the TRP 210. As such, the TRP 205 and the TRP 210 may identify the existing mismatch between the DOF 240 and the DOF of the UE 115-*a* and, in some examples, may make scheduling decisions (such as to involve other nodes having DOFs that are nearer to the DOF of the UE 115-*a* than the DOF 240) or may determine to tune their respective radio frequency chains (to reduce the difference between the DOF 240 and the DOF of the UE 115-*a*) based on the indication of the mismatch.

The UE 115-*a* may communicate with the selected TRPs over the indicated beams accordingly. In some implementations, the UE 115-*a* may receive a multi-TRP transmission from the selected TRPs via the beams indicated by the beam selection signaling and using the identified receive beams at the UE 115-*a*. In some other implementations, the UE 115-*a* may transmit a multi-TRP transmission to the selected TRPs using the identified transmit beams at the UE 115-*a* and the selected TRPs may receive the multi-TRP transmission via the beams indicated by the beam selection signaling. The UE 115-*a*, based on dynamically selecting which TRPs to connect with based on a DOF mismatch across multiple TRPs and the UE 115-*a*, may experience a greater likelihood for successful communications because the UE 115-*a* and the selected TRPs may communicate via ports, antenna panels, or antenna modules that are configured for relatively high beamforming array gain at similar frequencies (frequencies within a threshold range of each other). Additionally, or alternatively, the UE 115-*a* may select which beams to use for communicating with the selected TRPs based on interference considerations. For example, the UE 115-*a* may select which beams the selected TRPs may use for communication with the UE 115-*a* and which beams the UE 115-*a* may use for communication with the selected TRPs based on selecting beams associated with out-of-band emissions (or an out-of-band emission metric) lower than an out-of-band emission threshold.

Additionally, in some examples, the UE 115-*a* may identify a beam to use from the UE 115-*a* for communicating with the TRP based on an SSB index (which may indicate a beam direction associated with a corresponding SSB). For example, the UE 115-*a* may identify one or more receive beams (such as a receive beam pair) for receiving a multi-TRP transmission (such as a space division multiplexing (SDM) multi-TRP transmission) in the downlink. In examples in which the selected TRPs operate over different radio frequency spectrum bands (such as over FRx and FRy in which FRx or FRy may be FR2, FR3, FR4, or FR5), a receive beam pair may include a first beam that the UE 115-*a* may use to receive the multi-TRP transmission over FRx and a second beam that the UE 115-*a* may use to receive the multi-TRP transmission over FRy. Additionally, or alternatively, the UE 115-*a* may identify one or more transmit beams (such as a transmit beam pair) for transmitting a multi-TRP transmission (such as an SDM multi-TRP transmission) in the uplink. In examples in which the selected TRPs operate over different radio frequency spectrum bands (such as over FRx and FRy in which FRx or FRy may be FR2, FR4, or FR5), a transmit beam pair may include a first beam that the UE 115-*a* may use to transmit the multi-TRP transmission over FRx and a second beam that the UE 115-*a* may use to transmit the multi-TRP transmission over FRy.

As such, the UE 115-*a* may select which TRPs of the TRP 205, the TRP 210, and the TRP 215 the UE 115-*a* may connect with based on a mismatch between a DOF of each TRP and a DOF of the UE 115-*a* and may determine which beams the selected TRPs may use for communication with the UE 115-*a* based on a beam sweeping procedure (which may cover various radio frequency spectrum bands, such as FR2 and FR4 radio frequency spectrum bands, based on the radio frequency spectrum bands over which the UE 115-*a* and the TRPs operate). The UE 115-*a* may transmit beam selection signaling to one or more of the TRPs (the selected TRPs) indicating which TRPs the UE 115-*a* selects to communicate with as well as the beams that the selected TRPs may use to communicate with the UE 115-*a*. Further, in some implementations, the UE 115-*a* may include an indication of the beams that the UE 115-*a* may use to communicate with the selected TRPs in the beam selection signaling.

In some examples, the UE 115-*a* may dynamically change or adjust a codebook of the UE 115-*a* to dynamically change to a DOF of one or more antenna modules of the UE 115-*a*. In such examples, the UE 115-*a* may determine to re-select which TRPs to communicate with (for example, if another TRP different than the TRPs to which the UE 115-*a* is currently connected to has a DOF closer to the new DOF of the UE 115-*a*). As such, the UE 115-*a* may transmit additional signaling (another instance of beam selection signaling) to indicate the newly selected TRPs based on the adjusted DOF (the new DOF) of the UE 115-*a*. The UE 115-*a* also may transmit an indication of which beams (or antenna panels or ports) the newly selected TRPs may use to communicate with the UE 115-*a* and, in some implementations, may indicate a DOF mismatch for each indicated beam.

Further, although described herein in the context of the UE 115-*a* selecting the TRPs and the beams usable by selected TRPs for communication with the UE 115-*a*, one or more TRPs may perform similar operations or functions to determine (amongst themselves) which TRPs may communicate with the UE 115-*a* based on a DOF mismatch between the TRPs and the UE 115-*a*. In such examples in which TRPs may determine which TRPs may establish a connection with the UE 115-*a*, the TRPs may coordinate on the determination based on exchanging signaling via backhaul links between the TRPs. For example, the UE 115-*a* may transmit an indication of one or more DOFs supported by the UE 115-*a* to one or more of the TRPs, the TRPs may exchange signaling associated with the one or more DOFs supported by the UE 115-*a*, and the TRPs may determine which of the TRPs may establish a connection with the UE 115-*a* based on a difference between the DOFs supported by each of the TRPs and the one or more DOFs supported by the UE 115-*a*.

Additionally, the UE 115-*a* may transmit one or more uplink reference signals to the TRPs (such as sounding reference signals (SRSs)). The TRPs may determine which beams to use for communication between the selected TRPs and the UE 115-*a* based on receiving the one or more uplink reference signals from the UE 115-*a* (which may be part of an uplink-led beam training or beam sweeping procedure) and based on knowledge of which ports of the selected TRPs have a DOF similar to (within a threshold difference of) the one or more DOFs of the UE 115-*a*. One or more of the selected TRPs may transmit beam selection signaling to the UE 115-*a* indicating the selected TRPs and indicating which beams the selected TRPs or the UE 115-*a*, or both, may use to communicate with each other.

Figure 3:
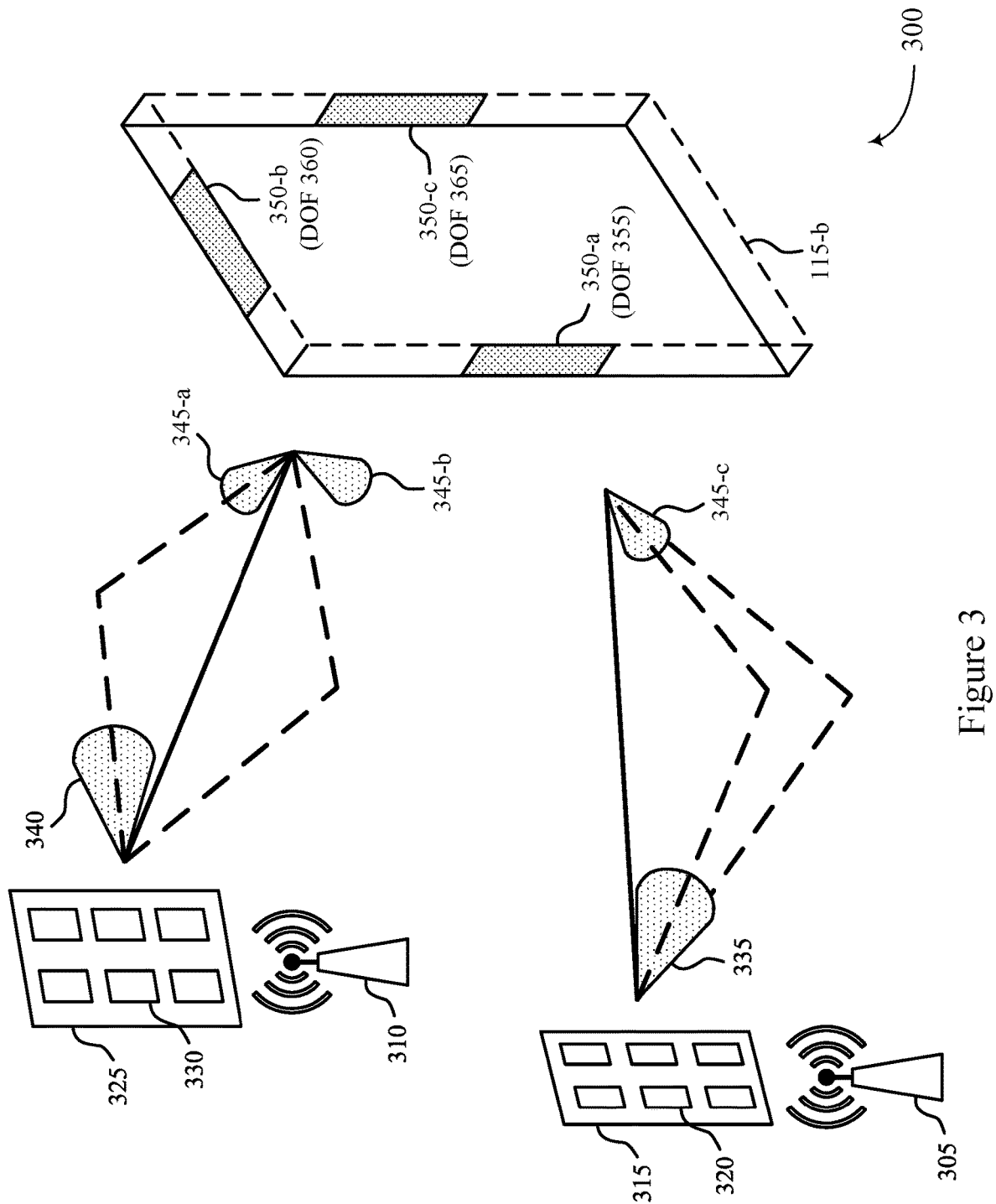
FIG. 3 illustrates an example of a beam selection diagram that supports techniques for indicating beams in multi-TRP systems based on a DOF mismatch.

FIG. 3 illustrates an example of a beam selection diagram 300 that supports techniques for indicating beams in multi-TRP systems based on a DOF mismatch. The beam selection diagram 300 illustrates the selection of TRPs to which the UE 115-*b* may establish a connection and the selection of beams that the selected TRPs may use for communication with the UE 115-*b*. In some examples, the UE 115-*b* may select to communicate with one or both of a TRP 305 or a TRP 310 based on a DOF mismatch between antenna panels of the TRPs and antenna modules 350 of the UE 115-*b*.

For example, the TRP 305 may operate an antenna panel 315 over a first radio frequency spectrum band and may configure the antenna panel 315 with a first DOF within the first radio frequency spectrum band. The antenna panel 315 may include a number of antenna elements 320 and, in some aspects, the inter-element spacing of the antenna elements 320 may influence the first DOF configured at the antenna panel 315. Similarly, the TRP 310 may operate an antenna panel 325 over a second radio frequency spectrum band and may configure the antenna panel 325 with a second DOF within the second radio frequency spectrum band. The antenna panel 325 may include a number of antenna elements 330 and, in some aspects, the inter-element spacing of the antenna elements 330 may influence the second DOF configured at the antenna panel 325.

In some aspects, the TRP 305 and the TRP 310 may operate over different radio frequency spectrum bands (such that the first radio frequency spectrum band is different from the second radio frequency spectrum band). For example, the TRP 305 may operate over an FRx radio frequency spectrum band and the TRP 310 may operate over an FRy radio frequency spectrum band (such that FRx or FRy may refer to one of FR1, FR2, FR4, or FR5). Alternatively, in some other aspects, the TRP 305 and the TRP 310 may operate over a same radio frequency spectrum band (such that the first radio frequency spectrum band is the same as the second radio frequency spectrum band). For example, the TRP 305 and the TRP 310 may both operate over the FR2 radio frequency spectrum band or the FR4 radio frequency spectrum band.

The UE 115-*b* may operate multiple antenna modules 350, including an antenna module 350-*a*, an antenna module 350-*b*, and an antenna module 350-*c*, over one or more radio frequency spectrum bands and may tune or configure each of the multiple antenna modules 350 to a DOF within the one or more radio frequency spectrum bands to increase or optimize performance of communication over the configured DOFs. For example, the UE 115-*b* may configure the antenna module 350-*a* with a DOF 355, may configure the antenna module 350-*b* with a DOF 360, and may configure the antenna module 350-*c* with a DOF 365.

The TRP 305 and the TRP 310 may form one or more directional beams from each antenna panel. For example, the TRP 305 may form a beam 335 from the antenna panel 315 of the TRP 305 and the TRP 310 may form a beam 340 from the antenna panel 325 of the TRP 310. Similarly, the UE 115-*b* may form one or more directional beams 345 from each antenna module 350 of the UE 115-*b*, including a beam 345-*a*, a beam 345-*b*, and a beam 345-*c*. As shown in FIG. 3, a solid line may illustrate a direct communication path between the TRP 305 or the TRP 310 and the UE 115-*b* and dotted lines may illustrate indirect (or non-line-of-sight) communication paths between the TRP 305 or the TRP 310 and the UE 115-*b* (such that signaling via an indirect communication path may reflect off of one or more objects). Further, although illustrated in FIG. 3 as un-associated with any specific one of the antenna modules 350 of the UE 115-*b*, the UE 115-*b* may form the beam 345-*a*, the beam 345-*b*, or the beam 345-*c* from any one or more of the antenna module 350-*a*, the antenna module 350-*b*, or the antenna module 350-*c* without exceeding the scope of the present disclosure.

In some examples, the UE 115-*b* may receive, from one or both of the TRP 305 or the TRP 310, an indication of the DOF of the antenna panel 315 of the TRP 305 and the DOF of the antenna panel 325 of the TRP 310. The UE 115-*b* may determine whether to select to communicate with one or both of the TRP 305 or the TRP 310 based on a first difference between the first DOF of the antenna panel 315 of the TRP 305 and a DOF of a corresponding antenna module 350 of the UE 115-*b* (an antenna module 350 of the UE 115-*b* that may receive a beam 335 from the antenna panel 315 of the TRP 305) and a second difference between the second DOF of the antenna panel 325 of the TRP 310 and a DOF of a corresponding antenna module 350 of the UE 115-*b* (an antenna module 350 of the UE 115-*b* that may receive a beam 340 from the antenna panel 325 of the TRP 310). For instance, in examples in which the UE 115-*b* determines that the first difference and the second difference are within or less than a threshold difference (which may be referred to herein as a threshold DOF mismatch), the UE 115-*b* may determine to establish a connection with the TRP 305 and with the TRP 310.

The UE 115-*b*, based on determining to establish a connection with the TRP 305 and the TRP 310 based on the DOF mismatch between the UE 115-*b* and each of the TRP 305 and the TRP 310, may receive one or more downlink reference signals (such as SSBs or CSI-RSs, among other examples) from each of the TRP 305 and the TRP 310 as part of a beam sweeping or beam training procedure. For example, the TRP 305 may transmit one or more SSBs over various beams 335 from the antenna panel 315 and the TRP 310 may transmit one or more SSBs over various beams 340 from the antenna panel 325 and the UE 115-*b* may monitor for the SSBs from the TRP 305 and the TRP 310 based on monitoring over various beams 345 from one or more of the antenna modules 350 of the UE 115-*b*. In some examples, the UE 115-*b* may identify a beam direction based on an SSB index included in each of the SSBs and may determine which of the TRP 305 or the TRP 310 transmitted an SSB based on a cell ID (which the UE 115-*b* may determine based on a MIB, a SIB1, and a SIB2 included in a received SSB). As such, the UE 115-*b* may identify which beams the TRP 305 and the TRP 310 may use for communications with the UE 115-*b* and the UE 115-*b* may identify which beams 345 to use for communicating with the TRP 305 and the TRP 310. Additionally, in some examples, the UE 115-*b* may identify which beams to use for communication between the UE 115-*b*, the TRP 305, and the TRP 310 based on an out-of-band emission threshold. In some aspects, the UE 115-*b* may determine to use the beam 345-*a* to communicate with the TRP 310 and to use the beam 345-*c* to communicate with the TRP 305.

The UE 115-*b* may transmit beam selection signaling to one or both of the TRP 305 or the TRP 310 including an indication of the beams that the UE 115-*b* identifies that the TRP 305 and the TRP 310 may use for communication with the UE 115-*b*. Additionally, or alternatively, the UE 115-*b* may transmit, within the beam selection signaling, an indication of the beams 345 (such as the beams 345-*a* and the beam 345-*c*) selected by the UE 115-*b* to use for communicating with the TRP 305 and the TRP 310. In some implementations, the UE 115-*b* may transmit, within the beam selection signaling or in signaling additional to the beam selection signaling, an indication of the DOF mismatch between an antenna module 350 of the UE 115-*b* and an antenna panel of a TRP to which the UE 115-*b* communicates using the antenna module 350. For instance, in examples in which the UE 115-*b* communicates with the antenna panel 315 of the TRP 305 using the antenna module 350-*a* of the UE 115-*b*, the UE 115-*b* may transmit an indication of the DOF mismatch (the measured difference in DOF) between the antenna panel 315 and the antenna module 350-*a*. Similarly, in examples in which the UE 115-*b* communicates with the antenna panel 325 of the TRP 310 using the antenna module 350-*b* of the UE 115-*b*, the UE 115-*b* may transmit an indication of the DOF mismatch (the measured difference in DOF) between the antenna panel 325 and the antenna module 350-*b*.

Figure 4:
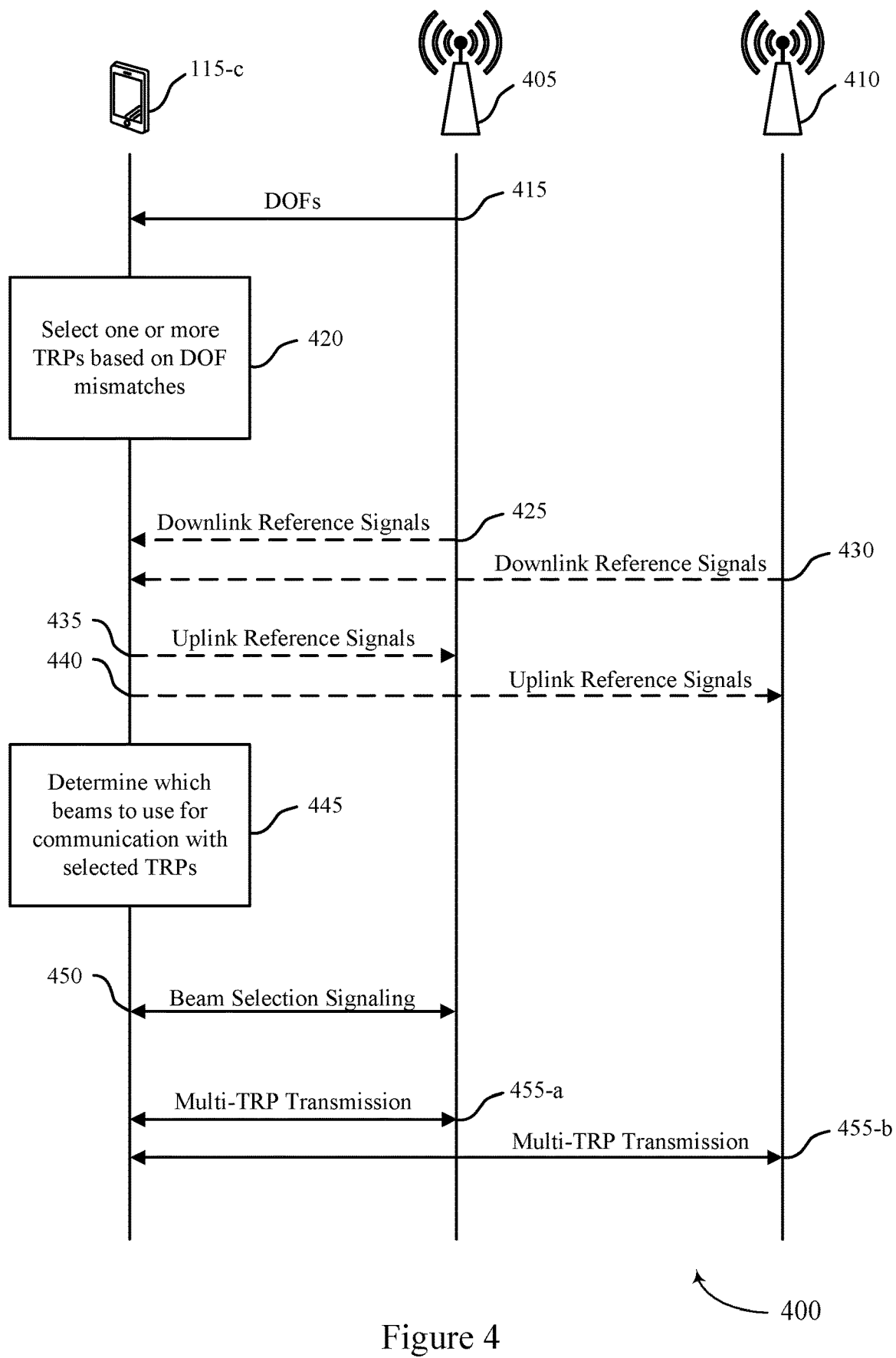
FIG. 4 illustrates an example of a process flow that supports techniques for indicating beams in multi-TRP systems based on a DOF mismatch.

FIG. 4 illustrates an example of a process flow 400 that supports techniques for indicating beams in multi-TRP systems based on a DOF mismatch. The process flow 400 illustrates communication between a UE 115-*c*, a TRP 405, and a TRP 410, which may be examples of corresponding devices described herein. For example, the UE 115-*c* may be an example of a UE 115, a UE 115-*a*, or a UE 115-*b* as described with reference to FIGS. 1-3. The TRP 405 and the TRP 410 may be examples of base stations 105 as described with reference to FIG. 1, two of the TRP 205, the TRP 210, and the TRP 215 as described with reference to FIG. 2, or the TRP 305 or the TRP 310 as described with reference to FIG. 3. The TRP 405 and the TRP 410 may operate over different radio frequency spectrum bands or may operate over a same radio frequency spectrum band. In some examples, the UE 115-*c* may select to communicate with one or both of the TRP 405 or the TRP 410 based on DOF mismatches between antenna ports of the TRPs and antenna modules of the UE 115-*c* and the UE 115-*c* also may indicate which beams the selected TRP(s) may use to communicate with the UE 115-*c* based on the DOF mismatches.

At 415, the TRP 405 may transmit, to the UE 115-*c*, a control message indicating a first set of DOFs for a first set of ports associated with the TRP 405 and indicating a second set of DOFs for a second set of ports associated with the TRP 410. For example, the control message may indicate a DOF for each if not all of the ports of the TRP 405 and a DOF for each if not all of the ports of the TRP 410.

At 420, the UE 115-*c* may select one or both of the TRP 405 or the TRP 410 based on DOF mismatches between one or more DOFs supported at the UE 115-*c* and the first set of DOFs supported at the TRP 405 and DOF mismatches between the one or more DOFs supported at the UE 115-*c* and the second set of DOFs supported at the TRP 410. Additional details relating to such selection of which TRPs to connect to based on DOF mismatches are described herein, including with reference to FIGS. 2 and 3.

At 425, the TRP 405 may, in some implementations, transmit a number of downlink reference signals (such as SSBs or CSI-RSs, among other examples) via a number of beams from each antenna panel or each port of the TRP 405. Similarly, at 430, the TRP 410 may, in some implementations, transmit a number of downlink reference signals via a number of beams from each antenna panel or each port of the TRP 410. In some examples, the TRP 405 and the TRP 410 may transmit their respective number of downlink reference signals as part of a beam training procedure (such as a beam training procedure within a synchronization or access procedure).

Additionally, or alternatively, at 435, the UE 115-*c* may, in some implementations, transmit a number of uplink reference signals (such as SRSs) to the TRP 405. Similarly, at 440, the UE 115-*c* may, in some implementations, transmit a number of uplink reference signals to the TRP 410. In some examples, the UE 115-*c* may transmit the number of uplink reference signals to the TRP 405 and the TRP 410 as part of a beam training procedure (such as a beam training procedure within a synchronization or access procedure).

At 445, the UE 115-*c* may select or otherwise determine which beams to use for communication with the selected TRPs. For instance, in examples in which the UE 115-*c* determines to connect with the TRP 405 and the TRP 410 (such that both the TRP 405 and the TRP 410 support DOFs within a threshold DOF mismatch of a DOF supported by the UE 115-*c*), the UE 115-*c* may select which beams the TRP 405 and the TRP 410 may use to communicate with the UE 115-*c* based on the number of downlink reference signals received from each TRP. Additional details relating to the selection of beams that the TRP 405 and the TRP 410 may use to communicate with the UE 115-*c* are described herein, including with reference to FIG. 3.

At 450, the UE 115-*c* may transmit or receive beam selection signaling to or from the TRP 405 indicating the selection of the TRP 405 and the TRP 410 for communication with the UE (indicating that the TRP 405 and the TRP 410 may communicate with the UE 115-*c*) and indicating at least one beam associated with a port for each TRP. For example, in addition to including an indication of the selection of which TRPs the UE 115-*c* may communicate with based on DOF mismatches, the beam selection signaling may indicate at least a first beam associated with a first port of the first set of ports associated with the TRP 405 and at least a second beam associated with a second port of the second set of ports associated with the TRP 410. As such, the beam selection signaling may indicate that the TRP 405 may use the first beam to communicate with the UE 115-*c* and that the TRP 410 may use the second beam to communicate with the UE 115-*c*.

In some implementations, the UE 115-*c* or the TRP 405 may indicate the first beam associated with the first port and the second beam associated with the second port based on determining that a first DOF of the first port is within a threshold DOF mismatch of one or more DOFs of the UE 115-*c* and that a second DOF of the second port is within the threshold DOF mismatch of the one or more DOFs of the UE 115-*c*. In examples in which the UE 115-*c* receives downlink reference signals from the TRP 405 and the TRP 410 at 425 and at 430, respectively, the UE 115-*c* may transmit the beam selection signaling to the TRP 405. In examples in which the UE 115-*c* transmits uplink reference signals to the TRP 405 and the TRP 410 at 435 and at 440, respectively, the UE 115-*c* my receive the beam selection signaling from the TRP 405.

At 455, the UE 115-*c*, the TRP 405, and the TRP 410 may transmit or receive a multi-TRP transmission. Such a joint/multi-TRP transmission may refer to simultaneous transmission of a same signal or message (such as an SDM transmission). In some examples, for instance, the TRP 405 and the TRP 410 may transmit a joint/multi-TRP transmission (for example, may transmit according to a multi-TRP communication scheme) and the UE 115-*c* may receive the joint/multi-TRP transmission. In such examples, the TRP 405 may transmit a first instance of the multi-TRP transmission to the UE 115-*c* at 455-*a* and the TRP 410 may transmit a second instance the multi-TRP transmission to the UE 115-*c* at 455-*b* (in which 455-*a* and 455-*b* may be simultaneous in time). In some other examples, the UE 115-*c* may transmit a joint/multi-TRP transmission to the TRP 405 and the TRP 410. In such examples, the UE 115-*c* may transmit a first instance of the multi-TRP transmission to the TRP 405 at 455-*a* and the UE 115-*c* may transmit a second instance of the multi-TRP transmission to the TRP 410 at 455-*b* (in which 445-*a* and 455-*b* may be simultaneous in time).

Figure 5:
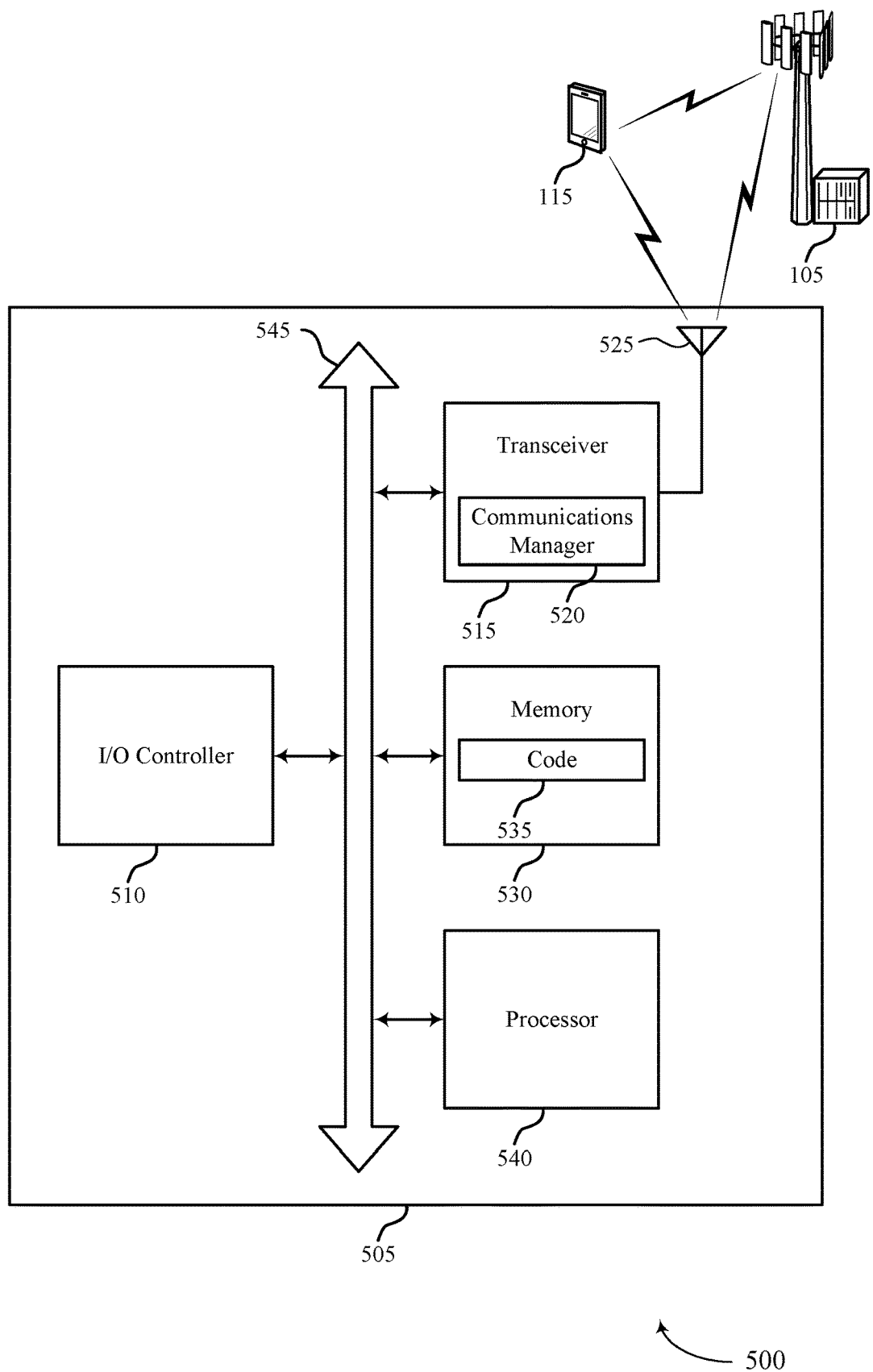
FIGS. 5 and 6 show block diagrams of example devices that support techniques for indicating beams in multi-TRP systems based on a DOF mismatch.

FIG. 5 shows a block diagram 500 of an example device 505 that supports techniques for indicating beams in multi-TRP systems based a DOF mismatch. The device 505 may communicate wirelessly with one or more base stations 105, UEs 115, or any combination thereof. The device 505 may include components for bi-directional voice and data communications including components for transmitting and receiving communications, such as a communications manager 520, an input/output (I/O) controller 510, a transceiver 515, an antenna 525, a memory 530, code 535, and a processor 540. These components may be in electronic communication or otherwise coupled (such as operatively, communicatively, functionally, electronically, electrically) via one or more buses (such as a bus 545).

The communications manager 520 may support wireless communication at a UE in accordance with examples as disclosed herein. The communications manager 520 may be configured as or otherwise support a means for receiving a control message indicating a first set of DOFs for a first set of ports associated with a first TRP and a second set of DOFs for a second set of ports associated with a second TRP. In some examples, the communications manager 520 may be configured as or otherwise support a means for transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

In some examples, to support transmitting or receiving the beam selection signaling for the multi-TRP transmission, the communications manager 520 may be configured as or otherwise support a means for transmitting or receiving an indication of the first beam associated with the first port and the second beam associated with the second port based on a first mismatch between a first DOF associated with the first port and a DOF of the UE being within a threshold mismatch and a second mismatch between a second DOF associated with the second port and the DOF of the UE being within the threshold mismatch. In some examples, to support transmitting or receiving the beam selection signaling for the multi-TRP transmission, the communications manager 520 may be configured as or otherwise support a means for transmitting or receiving an indication of a first mismatch between a first DOF associated with the first port and a DOF of the UE and a second mismatch between a second DOF associated with the second port and the DOF of the UE.

In some examples, to support transmitting or receiving the beam selection signaling for the multi-TRP transmission, the communications manager 520 may be configured as or otherwise support a means for transmitting or receiving the beam selection signaling indicating a receive beam pair of the UE for receiving the multi-TRP transmission from the first TRP and the second TRP. In some examples, the communications manager 520 may be configured as or otherwise support a means for receiving the multi-TRP transmission from the first TRP and the second TRP via the receive beam pair of the UE.

In some examples, to support receiving the multi-TRP transmission from the first TRP and the second TRP, the communications manager 520 may be configured as or otherwise support a means for receiving the multi-TRP transmission from the first TRP via at least the first beam over a first band and from the second TRP via at least the second beam over a second band, where the first band and the second band include ultra-wideband frequency bands. In some examples, to support transmitting or receiving the beam selection signaling for the multi-TRP transmission, the communications manager 520 may be configured as or otherwise support a means for transmitting or receiving the beam selection signaling indicating a transmit beam pair of the UE for transmitting the multi-TRP transmission to the first TRP and the second TRP.

In some examples, the communications manager 520 may be configured as or otherwise support a means for transmitting the multi-TRP transmission to the first TRP via a first transmit beam of the transmit beam pair and to the second TRP via a second transmit beam of the transmit beam pair. In some examples, the communications manager 520 may be configured as or otherwise support a means for receiving a first one or more downlink reference signals from the first TRP via a first one or more ports of the first set of ports and a second one or more downlink reference signals from the second TRP via a second one or more ports of the second set of ports, where the beam selection signaling is based on the first one or more downlink reference signals and the second one or more downlink reference signals.

In some examples, the communications manager 520 may be configured as or otherwise support a means for transmitting a first one or more uplink reference signals to the first TRP and a second one or more uplink reference signals to the second TRP, where the beam selection signaling is based on the first one or more uplink reference signals and the second one or more uplink reference signals. In some examples, to support transmitting or receiving the beam selection signaling for the multi-TRP transmission, the communications manager 520 may be configured as or otherwise support a means for transmitting or receiving an indication of the first beam associated with the first port and the second beam associated with the second port based on an out-band-emission associated with each of the first beam and the second beam satisfying a threshold on out-of-band emissions.

The I/O controller 510 may manage input and output signals for the device 505. The I/O controller 510 also may manage peripherals not integrated into the device 505. In some examples, the I/O controller 510 may represent a physical connection or port to an external peripheral. In some examples, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some examples, the I/O controller 510 may be implemented as part of a processor, such as the processor 540. In some examples, a user may interact with the device 505 via the I/O controller 510 or via hardware components controlled by the I/O controller 510.

In some examples, the device 505 may include a single antenna 525. However, in some other examples, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

The memory 530 may include random access memory (RAM) and read-only memory (ROM). The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some examples, the code 535 may not be directly executable by the processor 540 but may cause a computer (such as when compiled and executed) to perform functions described herein. In some examples, the memory 530 may contain, among other things, a basic I/O system (BIOS) which may control basic hardware or software operation such as the interaction with peripheral components or devices.

In some implementations, the processor 540 may be a component of a processing system. A processing system may generally refer to a system or series of machines or components that receives inputs and processes the inputs to produce a set of outputs (which may be passed to other systems or components of, for example, a UE 115). For example, a processing system of a UE 115 may refer to a system including the various other components or subcomponents of a UE 115.

The processing system of the UE 115 may interface with other components of the UE 115 and may process information received or obtained from other components (such as inputs or signals) and output information to other components. For example, a chip or modem of the UE 115 may include a processing system, a first interface to receive or obtain information, and a second interface to output, transmit, or provide information. In some implementations, the first interface may refer to an interface between the processing system of the chip or modem and a receiver, such that the UE 115 may receive information or signal inputs, and the information may be passed to the processing system. In some implementations, the second interface may refer to an interface between the processing system of the chip or modem and a transmitter, such that the UE 115 may transmit information output from the chip or modem. A person having ordinary skill in the art will readily recognize that the second interface also, or alternatively, may obtain or receive information or signal inputs, and the first interface also, or alternatively, may output, transmit, or provide information.

In some examples, the communications manager 520 may be configured to perform various operations (such as receiving, monitoring, transmitting) using or otherwise in cooperation with the transceiver 515, the one or more antennas 525, or any combination thereof. Although the communications manager 520 is illustrated as a separate component, in some examples, one or more functions described with reference to the communications manager 520 may be supported by or performed by the processor 540, the memory 530, the code 535, or any combination thereof. For example, the code 535 may include instructions executable by the processor 540 to cause the device 505 to perform various aspects of techniques for indicating beams in multi-TRP systems based on a DOF mismatch as described herein, or the processor 540 and the memory 530 may be otherwise configured to perform or support such operations.

Figure 6:
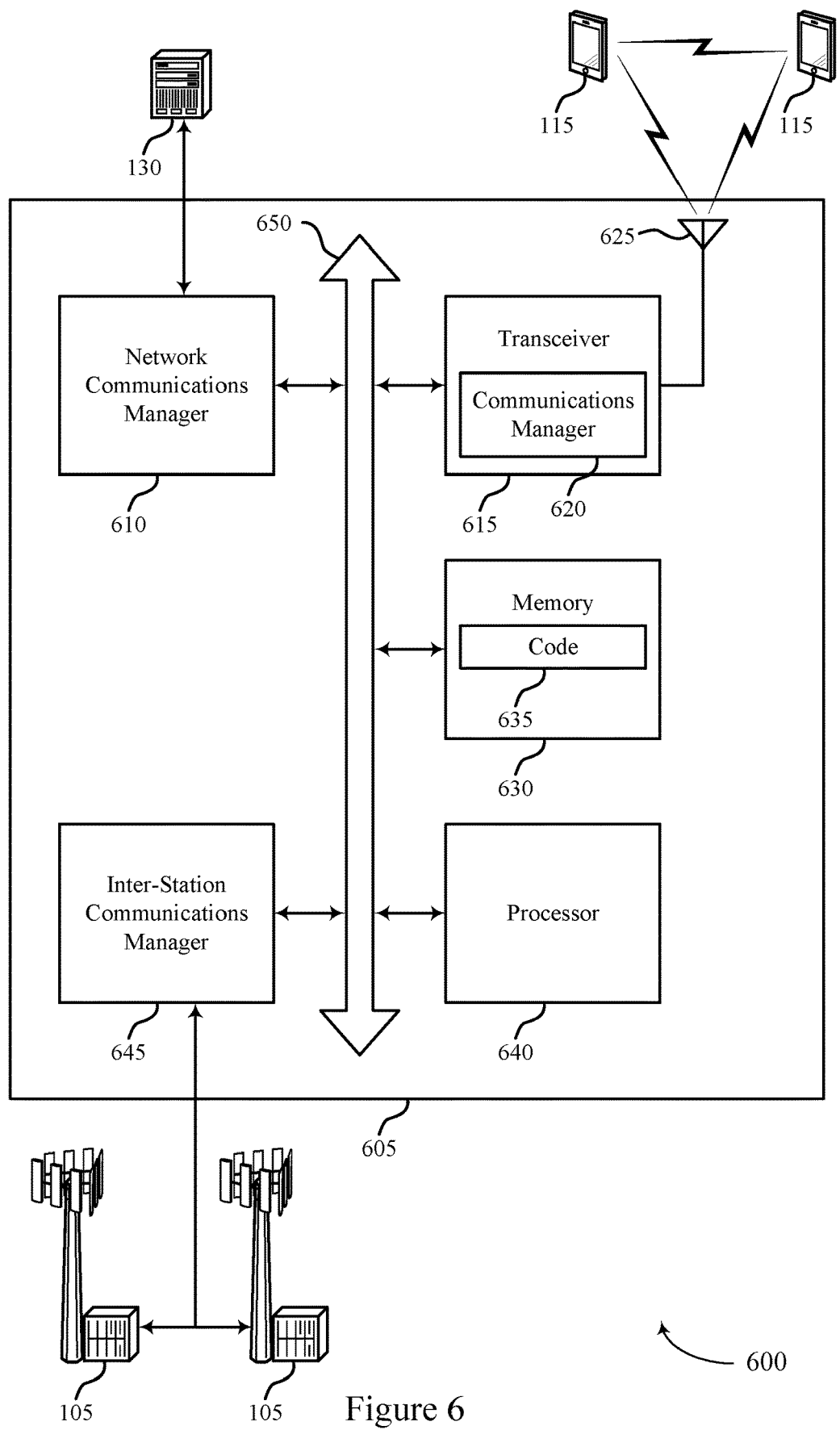

FIG. 6 shows a block diagram 600 of an example device 605 that supports techniques for indicating beams in multi-TRP systems based on a DOF mismatch. The device 605 may communicate wirelessly with one or more base stations 105, UEs 115, or any combination thereof. The device 605 may include components for bi-directional voice and data communications including components for transmitting and receiving communications, such as a communications manager 620, a network communications manager 610, a transceiver 615, an antenna 625, a memory 630, code 635, a processor 640, and an inter-station communications manager 645. These components may be in electronic communication or otherwise coupled (such as operatively, communicatively, functionally, electronically, electrically) via one or more buses (such as a bus 650).

The communications manager 620 may support wireless communication at a first TRP in accordance with examples as disclosed herein. The communications manager 620 may be configured as or otherwise support a means for transmitting, to a UE, a control message indicating a first set of DOFs for a first set of ports associated with the first TRP and a second set of DOFs for a second set of ports associated with a second TRP. In some examples, the communications manager 620 may be configured as or otherwise support a means for transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

In some examples, to support transmitting or receiving the beam selection signaling for the multi-TRP transmission, the communications manager 620 may be configured as or otherwise support a means for transmitting or receiving an indication of the first beam associated with the first port and the second beam associated with the second port based on a first mismatch between a first DOF associated with the first port and a DOF of the UE being within a threshold mismatch and a second mismatch between a second DOF associated with the second port and the DOF of the UE being within the threshold mismatch. In some examples, to support transmitting or receiving the beam selection signaling for the multi-TRP transmission, the communications manager 620 may be configured as or otherwise support a means for transmitting or receiving an indication of a first mismatch between a first DOF associated with the first port and a DOF of the UE and a second mismatch between a second DOF associated with the second port and the DOF of the UE.

In some examples, to support transmitting or receiving the beam selection signaling for the multi-TRP transmission, the communications manager 620 may be configured as or otherwise support a means for transmitting or receiving the beam selection signaling indicating a receive beam pair of the UE for receiving a multi-TRP transmission from the first TRP and the second TRP. In some examples, the communications manager 620 may be configured as or otherwise support a means for transmitting, to the UE and jointly with the second TRP, the multi-TRP transmission via a receive beam at the UE of the receive beam pair using at least the first beam associated with the first port.

In some examples, to support transmitting the multi-TRP transmission to the UE, the communications manager 620 may be configured as or otherwise support a means for transmitting the multi-TRP transmission over a first band different from a second band over which the second TRP transmits the multi-TRP transmission, where the first band and the second band include ultra-wideband frequency bands. In some examples, to support transmitting or receiving the beam selection signaling for the multi-TRP transmission, the communications manager 620 may be configured as or otherwise support a means for transmitting or receiving the beam selection signaling indicating a transmit beam pair of the UE for transmitting a multi-TRP transmission to the first TRP and the second TRP.

In some examples, the communications manager 620 may be configured as or otherwise support a means for receiving, from the UE, the multi-TRP transmission via a transmit beam of the transmit beam pair of the UE using at least the first beam associated with the first port. In some examples, the communications manager 620 may be configured as or otherwise support a means for transmitting one or more downlink reference signals via one or more ports of the first set of ports, where the beam selection signaling is based on the one or more downlink reference signals.

In some examples, the communications manager 620 may be configured as or otherwise support a means for receiving one or more uplink reference signals from the UE at one or more ports of the first set of ports, where the beam selection signaling is based on the one or more uplink reference signals. In some examples, to support transmitting or receiving the beam selection signaling for the multi-TRP transmission, the communications manager 620 may be configured as or otherwise support a means for transmitting or receiving an indication of the first beam associated with the first port and the second beam associated with the second port based on an out-band-emission associated with each of the first beam and the second beam satisfying a threshold on out-of-band emissions.

The network communications manager 610 may manage communications with a core network 130 (such as via one or more wired backhaul links). For example, the network communications manager 610 may manage the transfer of data communications for client devices, such as one or more UEs 115.

In some examples, the device 605 may include a single antenna 625. In some other examples, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

The memory 630 may include RAM and ROM. The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some examples, the code 635 may not be directly executable by the processor 640 but may cause a computer (such as when compiled and executed) to perform functions described herein. In some examples, the memory 630 may contain, among other things, a BIOS which may control basic hardware or software operation such as the interaction with peripheral components or devices.

In some implementations, the processor 740 may be a component of a processing system. A processing system may generally refer to a system or series of machines or components that receives inputs and processes the inputs to produce a set of outputs (which may be passed to other systems or components of, for example, a TRP or a base station 105). For example, a processing system of a base station 105 may refer to a system including the various other components or subcomponents of a TRP or a base station 105.

The processing system of the TRP may interface with other components of the TRP and may process information received from other components (such as inputs or signals) and output information to other components. For example, a chip or modem of the TRP may include a processing system, a first interface to receive or obtain information, and a second interface to output, transmit, or provide information. In some implementations, the first interface may refer to an interface between the processing system of the chip or modem and a receiver, such that the TRP may receive information or signal inputs, and the information may be passed to the processing system. In some implementations, the second interface may refer to an interface between the processing system of the chip or modem and a transmitter, such that the TRP may transmit information output from the chip or modem. A person having ordinary skill in the art will readily recognize that the second interface also, or alternatively, may obtain or receive information or signal inputs, and the first interface also, or alternatively, may output, transmit, or provide information.

The inter-station communications manager 645 may manage communications with other base stations 105, and may include a controller or scheduler for controlling communications with UEs 115 in cooperation with other base stations 105. For example, the inter-station communications manager 645 may coordinate scheduling for transmissions to UEs 115 for various interference mitigation techniques such as beamforming or joint transmission. In some examples, the inter-station communications manager 645 may provide an X2 interface within an LTE/LTE-A wireless communications network technology to provide communication between base stations 105.

The communications manager 620 may support wireless communication at a first TRP in accordance with examples as disclosed herein. For example, the communications manager 620 may be configured as or otherwise support a means for transmitting, to a UE, a control message indicating a first set of DOFs for a first set of ports associated with the first TRP and a second set of DOFs for a second set of ports associated with a second TRP. The communications manager 620 may be configured as or otherwise support a means for transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports.

In some examples, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of techniques for indicating beams in multi-TRP systems based on a DOF mismatch as described herein, or the processor 640 and the memory 630 may be otherwise configured to perform or support such operations.

Figure 7:
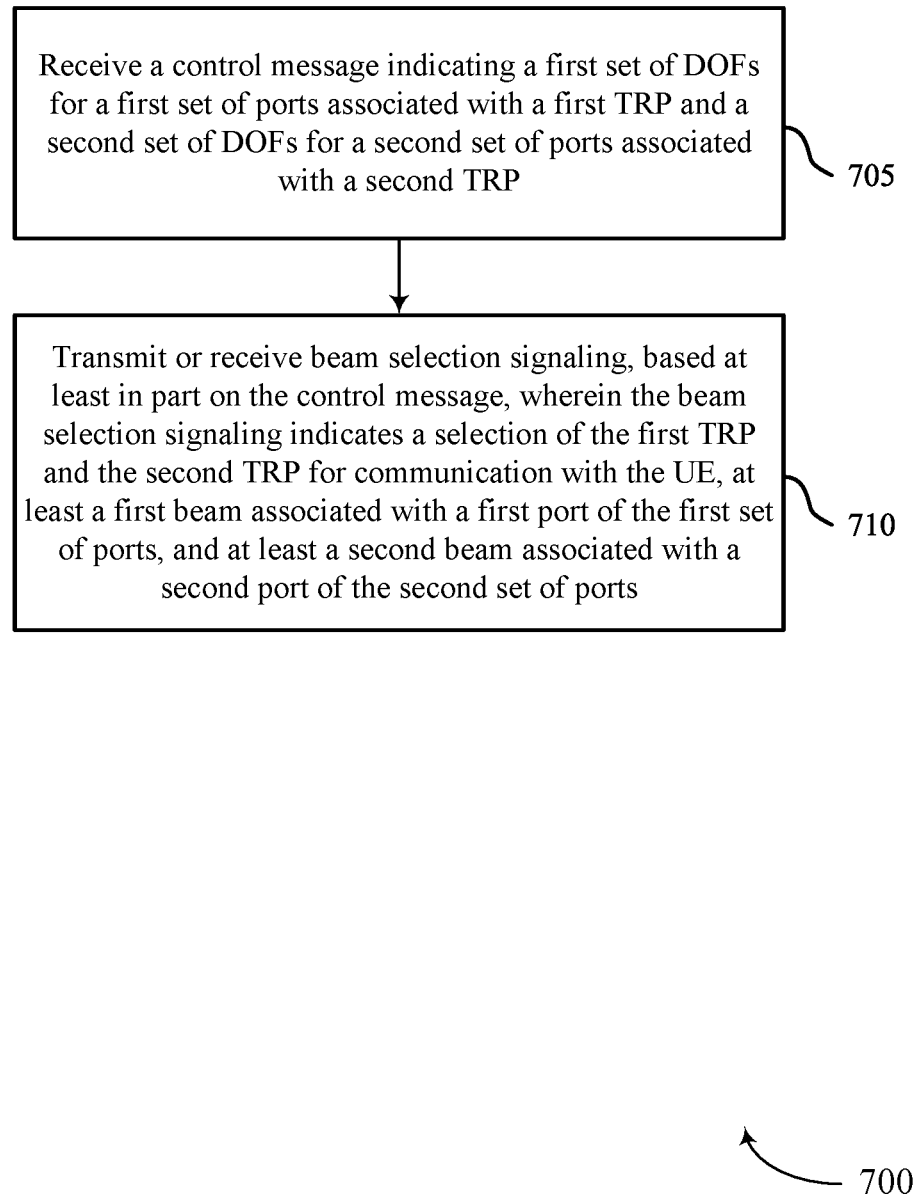
FIGS. 7 and 8 show flowcharts illustrating methods that support techniques for indicating beams in multi-TRP point systems based on a DOF mismatch.

FIG. 7 shows a flowchart illustrating a method 700 that supports techniques for indicating beams in multi-TRP point systems based on a DOF mismatch. The operations of the method 700 may be implemented by a UE or its components as described herein. For example, the operations of the method 700 may be performed by a UE 115 as described with reference to FIGS. 1-5. In some examples, a UE may execute a set of instructions to control the functional elements of the UE to perform the described functions. Additionally, or alternatively, the UE may perform aspects of the described functions using special-purpose hardware.

At 705, the method may include receiving a control message indicating a first set of DOFs for a first set of ports associated with a first TRP and a second set of DOFs for a second set of ports associated with a second TRP. The operations of 705 may be performed in accordance with examples as disclosed herein. In some examples, aspects of the operations of 705 may be performed by a communications manager as described with reference to FIG. 5.

At 710, the method may include transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports. The operations of 710 may be performed in accordance with examples as disclosed herein. In some examples, aspects of the operations of 710 may be performed by a communications manager as described with reference to FIG. 5.

Figure 8:
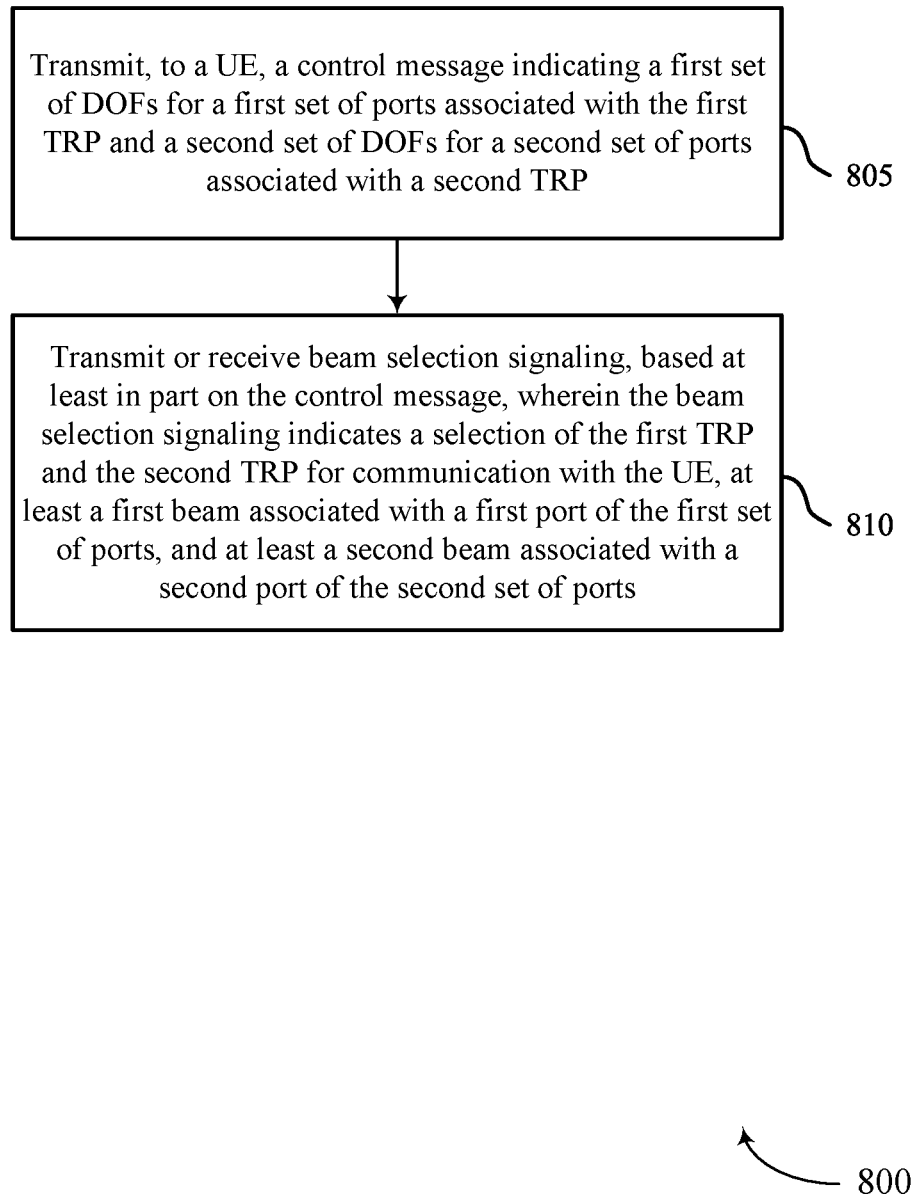

FIG. 8 shows a flowchart illustrating a method 800 that supports techniques for indicating beams in multi-TRP point systems based on a DOF mismatch. The operations of the method 800 may be implemented by a TRP or a base station, or its components as described herein. For example, the operations of the method 800 may be performed by a base station 105 as described with reference to FIGS. 1-4 and 6. In some examples, a base station may execute a set of instructions to control the functional elements of the base station to perform the described functions. Additionally, or alternatively, the base station may perform aspects of the described functions using special-purpose hardware.

At 805, the method may include transmitting, to a UE, a control message indicating a first set of DOFs for a first set of ports associated with the first TRP and a second set of DOFs for a second set of ports associated with a second TRP. The operations of 805 may be performed in accordance with examples as disclosed herein. In some examples, aspects of the operations of 805 may be performed by a communications manager as described with reference to FIG. 6.

At 810, the method may include transmitting or receiving beam selection signaling, based on the control message, where the beam selection signaling indicates a selection of the first TRP and the second TRP for communication with the UE, at least a first beam associated with a first port of the first set of ports, and at least a second beam associated with a second port of the second set of ports. The operations of 810 may be performed in accordance with examples as disclosed herein. In some examples, aspects of the operations of 810 may be performed by a communications manager as described with reference to FIG. 6.

The following provides an overview of some aspects of the present disclosure:

Aspect 1: A method for wireless communication at a UE, including: receiving a control message indicating a first set of DOFs for a first set of ports associated with a first TRP and a second set of DOFs for a second set of ports associated with a second TRP; and transmitting or receiving beam selection signaling, based at least in part on the control message, where the beam selection signaling indicates a selection of the first TRP and the second TRP for communication with the UE, at least a first beam associated with a first port of the first set of ports, and at least a second beam associated with a second port of the second set of ports.

Aspect 2: The method of aspect 1, where transmitting or receiving the beam selection signaling further includes: transmitting or receiving an indication of the first beam associated with the first port and the second beam associated with the second port based at least in part on a first mismatch between a first DOF associated with the first port and a DOF of the UE being within a threshold mismatch and a second mismatch between a second DOF associated with the second port and the DOF of the UE being within the threshold mismatch.

Aspect 3: The method of any of aspects 1 through 2, where transmitting or receiving the beam selection signaling further includes: transmitting or receiving an indication of a first mismatch between a first DOF associated with the first port and a DOF of the UE and a second mismatch between a second DOF associated with the second port and the DOF of the UE.

Aspect 4: The method of any of aspects 1 through 3, where transmitting or receiving the beam selection signaling further includes: transmitting or receiving the beam selection signaling indicating a receive beam pair of the UE for receiving a multi-TRP transmission from the first TRP and the second TRP.

Aspect 5: The method of aspect 4, further including: receiving the multi-TRP transmission from the first TRP and the second TRP via the receive beam pair of the UE.

Aspect 6: The method of aspect 5, where receiving the multi-TRP transmission from the first TRP and the second TRP includes: receiving the multi-TRP transmission from the first TRP via at least the first beam over a first band and from the second TRP via at least the second beam over a second band, where the first band and the second band include ultra-wideband frequency bands.

Aspect 7: The method of any of aspects 1 through 6, where transmitting or receiving the beam selection signaling further includes: transmitting or receiving the beam selection signaling indicating a transmit beam pair of the UE for transmitting a multi-TRP transmission to the first TRP and the second TRP.

Aspect 8: The method of aspect 7, further including: transmitting the multi-TRP transmission to the first TRP via a first transmit beam of the transmit beam pair and to the second TRP via a second transmit beam of the transmit beam pair.

Aspect 9: The method of any of aspects 1 through 8, further including: receiving a first one or more downlink reference signals from the first TRP via a first one or more ports of the first set of ports and a second one or more downlink reference signals from the second TRP via a second one or more ports of the second set of ports, where the beam selection signaling is based at least in part on the first one or more downlink reference signals and the second one or more downlink reference signals.

Aspect 10: The method of any of aspects 1 through 9, further including: transmitting a first one or more uplink reference signals to the first TRP and a second one or more uplink reference signals to the second TRP, where the beam selection signaling is based at least in part on the first one or more uplink reference signals and the second one or more uplink reference signals.

Aspect 11: The method of any of aspects 1 through 10, where transmitting or receiving the beam selection signaling further includes: transmitting or receiving an indication of the first beam associated with the first port and the second beam associated with the second port based at least in part on an out-band-emission associated with each of the first beam and the second beam satisfying a threshold on out-of-band emissions.

Aspect 12: A method for wireless communication at a first TRP, including: transmitting, to a UE, a control message indicating a first set of DOFs for a first set of ports associated with the first TRP and a second set of DOFs for a second set of ports associated with a second TRP; and transmitting or receiving beam selection signaling, based at least in part on the control message, where the beam selection signaling indicates a selection of the first TRP and the second TRP for communication with the UE, at least a first beam associated with a first port of the first set of ports, and at least a second beam associated with a second port of the second set of ports.

Aspect 13: The method of aspect 12, where transmitting or receiving the beam selection signaling further includes: transmitting or receiving an indication of the first beam associated with the first port and the second beam associated with the second port based at least in part on a first mismatch between a first DOF associated with the first port and a DOF of the UE being within a threshold mismatch and a second mismatch between a second DOF associated with the second port and the DOF of the UE being within the threshold mismatch.

Aspect 14: The method of any of aspects 12 through 13, where transmitting or receiving the beam selection signaling further includes: transmitting or receiving an indication of a first mismatch between a first DOF associated with the first port and a DOF of the UE and a second mismatch between a second DOF associated with the second port and the DOF of the UE.

Aspect 15: The method of any of aspects 12 through 14, where transmitting or receiving the beam selection signaling further includes: transmitting or receiving the beam selection signaling indicating a receive beam pair of the UE for receiving a multi-TRP transmission from the first TRP and the second TRP.

Aspect 16: The method of aspect 15, further including: transmitting, to the UE and jointly with the second TRP, the multi-TRP transmission via a receive beam at the UE of the receive beam pair using at least the first beam associated with the first port.

Aspect 17: The method of aspect 16, where transmitting the multi-TRP transmission to the UE includes: transmitting the multi-TRP transmission over a first band different from a second band over which the second TRP transmits the multi-TRP transmission, where the first band and the second band include ultra-wideband frequency bands.

Aspect 18: The method of any of aspects 12 through 17, where transmitting or receiving the beam selection signaling further includes: transmitting or receiving the beam selection signaling indicating a transmit beam pair of the UE for transmitting a multi-TRP transmission to the first TRP and the second TRP.

Aspect 19: The method of aspect 18, further including: receiving, from the UE, the multi-TRP transmission via a transmit beam of the transmit beam pair of the UE using at least the first beam associated with the first port.

Aspect 20: The method of any of aspects 12 through 19, further including: transmitting one or more downlink reference signals via one or more ports of the first set of ports, where the beam selection signaling is based at least in part on the one or more downlink reference signals.

Aspect 21: The method of any of aspects 12 through 20, further including: receiving one or more uplink reference signals from the UE at one or more ports of the first set of ports, where the beam selection signaling is based at least in part on the one or more uplink reference signals.

Aspect 22: The method of any of aspects 12 through 21, where transmitting or receiving the beam selection signaling further includes: transmitting or receiving an indication of the first beam associated with the first port and the second beam associated with the second port based at least in part on an out-band-emission associated with each of the first beam and the second beam satisfying a threshold on out-of-band emissions.

Aspect 23: An apparatus for wireless communication at a UE, including at least a first interface, a processing system, and a second interface configured to cause the apparatus to perform a method of any of aspects 1 through 11.

Aspect 24: An apparatus for wireless communication at a UE, including a processor; memory coupled with the processor; and instructions stored in the memory and executable by the processor to cause the apparatus to perform a method of any of aspects 1 through 11.

Aspect 25: An apparatus for wireless communication at a UE, including at least one means for performing a method of any of aspects 1 through 11.

Aspect 26: A non-transitory computer-readable medium storing code for wireless communication at a UE, the code including instructions executable by a processor to perform a method of any of aspects 1 through 11.

Aspect 27: An apparatus for wireless communication at a first TRP, including at least a first interface, a processing system, and a second interface configured to cause the apparatus to perform a method of any of aspects 12 through 22.

Aspect 28: An apparatus for wireless communication at a first TRP, including a processor; memory coupled with the processor; and instructions stored in the memory and executable by the processor to cause the apparatus to perform a method of any of aspects 12 through 22.

Aspect 29: An apparatus for wireless communication at a first TRP, including at least one means for performing a method of any of aspects 12 through 22.

Aspect 30: A non-transitory computer-readable medium storing code for wireless communication at a first TRP, the code including instructions executable by a processor to perform a method of any of aspects 12 through 22.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communication, comprising:
at least one processor; and
memory comprising instructions executable by the at least one processor to cause the apparatus to:
select a first beam associated with a first port of a first set of ports in accordance with a first mismatch between a first default operating frequency of the first port and a first default operating frequency of the apparatus, wherein the first set of ports is associated with a first transmission and reception point (TRP) and a first set of default operating frequencies, and wherein the first set of default operating frequencies includes the first default operating frequency of the first port;
select a second beam associated with a second port of a second set of ports in accordance with a second mismatch between a second default operating frequency of the second port and a second default operating frequency of the apparatus, wherein the second set of ports is associated with a second TRP and a second set of default operating frequencies, and wherein the second set of default operating frequencies includes the second default operating frequency of the second port; and
output, for transmission, a beam selection signaling that indicates the first TRP and the second TRP for communication with the apparatus, the first beam, and the second beam.

2. The apparatus of claim 1, wherein the instructions are further executable by the at least one processor to cause the apparatus to:
obtain a control message indicating the first set of default operating frequencies and the second set of default operating frequencies.

3. The apparatus of claim 1, wherein the first mismatch is less than or equal to a threshold mismatch and the second mismatch is less than or equal to the threshold mismatch.

4. The apparatus of claim 1, wherein the beam selection signaling further indicates:
the first mismatch and the second mismatch.

5. The apparatus of claim 1, wherein:
the beam selection signaling further indicates:
a receive beam pair of the apparatus for obtaining a multi-TRP transmission from the first TRP and the second TRP; and
the instructions are further executable by the at least one processor to cause the apparatus to:
obtain the multi-TRP transmission from the first TRP and the second TRP via the receive beam pair of the apparatus.

6. The apparatus of claim 5, wherein the multi-TRP transmission is obtained from the first TRP via at least the first beam and a first band and from the second TRP via at least the second beam and a second band, wherein the first band and the second band comprise ultra-wideband frequency bands, wherein the receive beam pair includes the first beam and the second beam.

7. The apparatus of claim 1, wherein:
the beam selection signaling further indicates:
a transmit beam pair of the apparatus for outputting a multi-TRP transmission to the first TRP and the second TRP; and
the instructions are further executable by the at least one processor to cause the apparatus to:
output the multi-TRP transmission to the first TRP via a first transmit beam of the transmit beam pair and to the second TRP via a second transmit beam of the transmit beam pair.

8. The apparatus of claim 1, wherein the instructions are further executable by the at least one processor to cause the apparatus to:
obtain:
a first one or more downlink reference signals from the first TRP via a first one or more ports of the first set of ports; and
a second one or more downlink reference signals from the second TRP via a second one or more ports of the second set of ports, wherein a content of the beam selection signaling is based at least in part on the first one or more downlink reference signals and the second one or more downlink reference signals.

9. The apparatus of claim 1, wherein the instructions are further executable by the at least one processor to cause the apparatus to:
output:
a first one or more uplink reference signals to the first TRP; and
a second one or more uplink reference signals to the second TRP, wherein a content of the beam selection signaling is based at least in part on the first one or more uplink reference signals and the second one or more uplink reference signals.

10. The apparatus of claim 1, wherein the first beam and the second beam are selected based at least in part on a respective out-of-band-emission associated with each of the first beam and the second beam satisfying a threshold.

11. The apparatus of claim 1, wherein:
the first default operating frequency of the apparatus is the same as the second default operating frequency of the apparatus; or
the first default operating frequency of the apparatus is different from the second default operating frequency of the apparatus.

12. The apparatus of claim 1, wherein:
the first default operating frequency of the apparatus and the second default operating frequency of the apparatus correspond to a same antenna module of the apparatus; or
the first default operating frequency of the apparatus corresponds to a first antenna module of the apparatus and the second default operating frequency of the apparatus corresponds to a second antenna module of the apparatus.

13. The apparatus of claim 1, further comprising:
one or more transmitters via which the beam selection signaling is output, wherein the apparatus is configured as a user equipment (UE).

14. An apparatus for wireless communication, comprising:
at least one processor; and
memory comprising instructions executable by the at least one processor to cause the apparatus to:
   obtain, from a user equipment (UE), a beam selection signaling that indicates:
      a first transmission and reception point (TRP) and a second TRP for communication with the UE,
      at least a first beam associated with a first port of a first set of ports associated with the first TRP, wherein the indication of the first beam is associated with a first mismatch between a first default operating frequency, from the first set of default operating frequencies, of the first port and a first default operating frequency of the UE, and
      at least a second beam associated with a second port of a second set of ports associated with the second TRP, wherein the indication of the second beam is associated with a second mismatch between a second default operating frequency, from the second set of default operating frequencies, of the second port and a second default operating frequency of the UE; and
   output, for transmission to the UE and jointly with the second TRP, a multi-TRP transmission using at least the first beam associated with the first port.

15. The apparatus of claim 14, wherein the first mismatch is less than or equal to a threshold mismatch and the second mismatch is less than or equal to the threshold mismatch.

16. The apparatus of claim 14, wherein the instructions to output the multi-TRP transmission to the UE are further executable by the at least one processor to cause the apparatus to:
   output the multi-TRP transmission via a first band different from a second band via which the second TRP transmits the multi-TRP transmission, wherein the first band and the second band comprise ultra-wideband frequency bands.

17. The apparatus of claim 14, further comprising:
one or more receivers via which the beam selection signaling is obtained, wherein the apparatus is configured as the first TRP.

18. A method for wireless communication at a user equipment (UE), comprising:
   selecting a first beam associated with a first port of a first set of ports in accordance with a first mismatch between a first default operating frequency of the first port and a first default operating frequency of the UE, wherein the first set of ports is associated with a first transmission and reception point (TRP) and a first set of default operating frequencies, and wherein the first set of default operating frequencies includes the first default operating frequency of the first port;
   selecting a second beam associated with a second port of a second set of ports in accordance with a second mismatch between a second default operating frequency of the second port and a second default operating frequency of the UE, wherein the second set of ports is associated with a second TRP and a second set of default operating frequencies, and wherein the second set of default operating frequencies includes the second default operating frequency of the second port; and
   outputting, for transmission, a beam selection signaling that indicates the first TRP and the second TRP for communication with the UE, the first beam, and the second beam.

19. The method of claim 18, further comprising:
obtaining a control message indicating the first set of default operating frequencies and the second set of default operating frequencies.

20. The method of claim 18, wherein the first mismatch is less than or equal to a threshold mismatch and the second mismatch is less than or equal to the threshold mismatch.

* * * * *